United States Patent
Yahaya et al.

(10) Patent No.: US 11,007,491 B2
(45) Date of Patent: May 18, 2021

(54) AROMATIC CO-POLYIMIDE GAS SEPARATION MEMBRANES DERIVED FROM 6FDA-6FPDA-TYPE HOMO-POLYIMIDES

(71) Applicant: Saudi Arabian Oil Company, Dhahran (SA)

(72) Inventors: Garba Oloriegbe Yahaya, Dhahran (SA); Ali Hayek, Dhahran (SA); Abdulkarim Alsamah, Dhahran (SA); Ahmad Bahamdan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 172 days.

(21) Appl. No.: 16/287,467

(22) Filed: Feb. 27, 2019

(65) Prior Publication Data

US 2020/0269195 A1    Aug. 27, 2020

(51) Int. Cl.
*B01D 71/64* (2006.01)
*B01D 53/22* (2006.01)
(Continued)

(52) U.S. Cl.
CPC ........... *B01D 71/64* (2013.01); *B01D 53/228* (2013.01); *B01D 67/0013* (2013.01);
(Continued)

(58) Field of Classification Search
None
See application file for complete search history.

(56) References Cited

U.S. PATENT DOCUMENTS 4,705,540 A    11/1987    Hayes
4,717,393 A     1/1988    Hayes
(Continued)

FOREIGN PATENT DOCUMENTS

DE    10249480 A1    5/2004
EP     0554862 A1    8/1993
(Continued)

OTHER PUBLICATIONS

Invitation to pay additional fees and where applicable, protest fee dated May 26, 2020.
(Continued)

*Primary Examiner* — Jason M Greene
(74) *Attorney, Agent, or Firm* — Bracewell LLP; Constance G. Rhebergen; Kevin R. Tamm

(57) ABSTRACT

Co-polyimide membranes for separating components of sour natural gas including at least three distinct moieties polymerized together, the moieties including a 2,2'-bis(3,4-dicarboxyphenyl)hexafluoropropane dianhydride (6FDA) based moiety; a 4,4'-(hexafluoroisopropylidene)dianiline (6FpDA) based moiety; and at least one component selected from the group consisting of: a 9,9-bis(4-aminophenyl)fluorene (CARDO) based moiety; a 2,3,5,6-tetramethyl-1,4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety.

29 Claims, 18 Drawing Sheets

(51) Int. Cl.
  *B01D 67/00* (2006.01)
  *B01D 71/80* (2006.01)
  *C08G 73/10* (2006.01)
  *C10L 3/10* (2006.01)

(52) U.S. Cl.
  CPC ......... *B01D 71/80* (2013.01); *C08G 73/1007* (2013.01); *C08G 73/1039* (2013.01); *C08G 73/1042* (2013.01); *C08G 73/1067* (2013.01); *C10L 3/101* (2013.01); *C10L 3/103* (2013.01); *C10L 3/104* (2013.01); *C10L 3/105* (2013.01); *C10L 2290/548* (2013.01)

(56) References Cited

U.S. PATENT DOCUMENTS

| | | | |
|---|---|---|---|
| 4,880,442 | A | 11/1989 | Hayes |
| 4,912,197 | A | 3/1990 | Hayes |
| 4,954,144 | A | 9/1990 | Burgoyne, Jr. et al. |
| 5,074,891 | A | 12/1991 | Kohn et al. |
| 5,085,676 | A * | 2/1992 | Ekiner .................. B01D 71/64 210/500.23 |
| 5,112,941 | A | 5/1992 | Kasai et al. |
| 5,202,412 | A | 4/1993 | Auman et al. |
| 5,234,471 | A | 8/1993 | Weinberg |
| 5,246,743 | A | 9/1993 | Kusuki et al. |
| 5,320,650 | A | 6/1994 | Simmons |
| 5,725,633 | A | 3/1998 | Ozcayir et al. |
| 6,562,110 | B2 | 5/2003 | Koros et al. |
| 7,109,140 | B2 | 9/2006 | Marand et al. |
| 8,075,824 | B2 | 12/2011 | Yoshinaga et al. |
| 8,192,524 | B2 | 6/2012 | Chinn et al. |
| 8,221,531 | B2 | 7/2012 | Wind et al. |
| 8,580,012 | B2 | 11/2013 | Hoshino et al. |
| 8,614,288 | B2 | 12/2013 | Liu et al. |
| 8,664,335 | B2 | 3/2014 | Koros et al. |
| 8,668,992 | B2 | 3/2014 | Hong et al. |
| 9,567,436 | B2 | 2/2017 | Liu |
| 9,718,923 | B2 | 8/2017 | Miller et al. |
| 9,733,522 | B2 | 8/2017 | Choi et al. |
| 9,962,646 | B2 | 5/2018 | Yahaya et al. |
| 2003/0220188 | A1* | 11/2003 | Marand .................. B01D 71/64 502/60 |
| 2011/0269915 | A1 | 11/2011 | Koros et al. |
| 2012/0202953 | A1 | 8/2012 | Suzuki et al. |
| 2014/0137735 | A1 | 5/2014 | Bhandari et al. |
| 2015/0005468 | A1 | 1/2015 | Osman et al. |
| 2016/0214067 | A1 | 7/2016 | Miller et al. |
| 2017/0189850 | A1* | 7/2017 | Yahaya .................. B01D 71/64 |
| 2017/0189866 | A1 | 7/2017 | Koros et al. |
| 2018/0345229 | A1 | 12/2018 | Yahaya et al. |

FOREIGN PATENT DOCUMENTS

| | | |
|---|---|---|
| WO | 02064242 A2 | 8/2002 |
| WO | 2018222815 A1 | 12/2018 |

OTHER PUBLICATIONS

Kraftschik et al., "Dense film polyimide membranes for aggressive sour gas feed separations", Journal of Membrane Science, 2013, pp. 608-619, Elsevier.

Niwa et al., "Preparation of Novel Fluorinated Block Copolyimide Membranes for Gas Separation", Journal of Applied Polymer Science, 2006, pp. 2436-2442, Wiley Periodicals, Inc.

Tien-Binh et al., "Polymer functionalization to enhance interface quality of mixed matrix membranes for high CO2/CH4 gas separation",Journal of Materials Chemistry A, 2015, pp. 15202-15213, The Royal Society of Chemistry.

Wind et al., "Natural gas permeation in polyimide membranes", Journal of Membrane Science, 2004, pp. 227-236, Elsevier.

Esekhile, O. et al., "Permeation of Butane Isomers through 6FDA-DAM Dense Films", J. Polym. Sci. partb: Polym. Phys.49 (2011) 1605-1620.

Qiu, L., Gas Separation Performance of 6FDA-Based Polyimides with Different Chemical Structures, Polymer 54 (2013) 6226-6235.

R. Wang, et al,; "A Critical Review on Diffusivity and the Characterization of Diffusivity of 6FDA-6FpDA Polyimide Membranes for Gas Separation", J. Membr.Sci.198 (2002) 259-271.

\* cited by examiner

AROMATIC CO-POLYIMIDE GAS SEPARATION MEMBRANES DERIVED FROM 6FDA-6FPDA-TYPE HOMO-POLYIMIDES

BACKGROUND

Field

Embodiments of the disclosure relate to membranes and separations for hydrocarbons. In particular, embodiments of the disclosure show co-polyimide membranes for sour gas separations relating to natural gas.

Description of the Related Art

In recent years, certain interest in clean energy has increased, and world-wide demand for clean-burning natural gas is also rising. Natural gas consumption is likely to grow at a compounded annual growth rate of about 2.7% from about 2,600 Billion Cubic Meters (BCM) in 2005 to around 3,900 BCM in 2020. Based on 2006 estimates, natural gas has a reserve-to-production ratio of 61 years and a resource-to-production ratio of 133 years.

Raw natural gas varies greatly in composition depending on its extraction origin. Although methane constitutes the key component of raw natural gas, it may also contain considerable amounts of impurities including water, hydrogen sulfide ($H_2S$), carbon dioxide, nitrogen and other hydrocarbons. Natural gas (methane) is a main feedstock for the chemical industry, and with the potential growth in demand for natural gas, separation technologies with high efficiency are required in order to be able to exploit gas fields which are not yet commercially viable because of high contaminant contents.

Most of the gas reserves around the world are of low-quality with high contents of impurities, which include acid gas (carbon dioxide ($CO_2$) and hydrogen sulfide ($H_2S$)), water, heavy hydrocarbons ($C_3$+) and other contaminants such as helium, nitrogen, mercaptans etc. For natural gas to meet the sales gas and pipeline specifications, these contaminants, especially acid gas which constitutes the largest amount of impurity in many existing natural gas reserves, need to be removed. One requirement for natural gas sweetening processes involve the separation of acid gases from natural gas, and this treatment is important in order to prevent corrosion of transportation pipelines, reduce atmospheric pollution, and avoid other detrimental effects.

In some systems, the removal of acid gases occurs before the gas is delivered to pipelines or stored in portable cylinders as compressed natural gas. At high concentrations, acid gases can corrode transportation pipelines. Moreover, $H_2S$ is toxic and its combustion produces harmful $SO_2$ gas. Thus, sweetening of natural gas (removal of contaminants, such as for example $H_2S$) is needed to reduce pipeline corrosion, prevent atmospheric pollution, increase fuel heating value of natural gas, and decrease the volume of gas to be transported in pipelines and cylinders.

Presently, natural gas treatment and upgrading incorporates industrial gas separation processes. Examples of natural gas treatment technology that have been widely applied include absorption and adsorption of acid gases, such as for example through amine absorption processes and pressure swing adsorption (PSA), respectively. However, conventional technologies are associated with several problems, which include high energy requirements and high capital costs.

Absorption of acid gases in basic solvents, such as liquid amines and hot aqueous potassium carbonate solutions, and pressure swing adsorption (PSA) are examples of natural gas purification alternative technologies that are commercially available. However, a number of drawbacks to these processes exist as they rely upon energy-intensive thermal regeneration steps, large environmental footprints, heavy maintenance requirements, and high capital costs.

The development of membrane materials for sour acid gas separations rarely has been studied. Studies that have been reported include studies on $H_2S/CH_4$ separation performance using rubbery polymeric membranes. However, since rubbery polymeric materials separate based on solubility selectivity, the $CO_2/CH_4$ separation capability of the rubbery polymeric membranes declines sharply and is much lower than other glassy polymers such as cellulose acetate (CA). Furthermore, the mechanical stability of rubbery polymers tends to fall to significantly less than that of glassy polymeric materials. Certain existing membranes require stringent pretreatment for water and heavy hydrocarbons content, as the membranes are very susceptible to swelling and plasticization in the presence of heavy hydrocarbons; benzene, toluene, and xylene (BTX); water; and other condensable gases.

Glassy polyimide is one type of polymeric membrane that has been investigated for acid gas separations from natural gas. These high glass transition temperature (Tg) (Tg>about 300° C.) materials develop certain acid gas separation capability based on size selectivity. Natural gas is usually treated at high pressures (more than 900 psi) and typically saturated with heavy hydrocarbons ($C_{3+}$) and water vapor. Inadequate performance of current existing polymeric membranes impedes the full utilization of separation membranes on the industrial scale. Some of the challenges include inability to achieve both high permeability and selectivity, selectivity-permeability trade-off, membrane plasticization, and physical aging. These issues inhibit long-term gas separation performance and membrane stability. Thus, polymeric membrane materials with high permeation properties (i.e., both high permeability and selectivity) are necessary for the viability of membrane-based natural gas separations and membrane-absorption hybrid processes.

A variety of processes and techniques have been developed to separate and recover helium from multicomponent gas streams, such as natural gas. Such processes include stand-alone membrane units, stand-alone cryogenic units and combinations of membrane units, cryogenic units and pressure swing adsorption (PSA) units. Stand-alone cryogenic processes have been used to produce crude helium at high recovery rates from natural gas or other streams containing low purity helium.

When the concentration of helium in the feed drops to low levels; e.g., below about 1 mol. %, processes using stand-alone cryogenic units become inefficient and impractical. Helium is typically present in natural gas at below about 0.5 mol. % levels and is mostly extracted as crude helium across liquid natural gas (LNG) trains. World demand for helium is increasing, and this is expected to put pressure on production facilities as demand for high-purity helium products begins to outstrip supply. In light of these trends, processing methods that overcome the inefficient cryogenic process (especially at below 0.5 mol. % He in natural gas) are needed.

In order to enhance and optimize polyimide materials for gas separation membranes, further improvement of their properties is required, and this can be achieved by chemical modification of the polymers.

SUMMARY

Applicant has recognized that there is a need for efficient membrane separation apparatus, methods, and systems for selectively separating sour gas and unwanted components from sour natural gas feeds. The disclosure presents apparatus, methods, and systems applying membranes which show efficient, surprising, and unexpected separations of undesirable components from a sour natural gas feed. Unlike conventional technologies, membrane-based separations of the present disclosure do not exhibit drawbacks of conventional technology, as they are much more energy efficient, have less footprint, and are flexible in operation. Separation of helium from natural gas using high-performance membranes or combination of membranes with any of the other processes described previously that achieve a satisfactorily high helium recovery can improve the efficiency of the separation processes.

Limited data have been reported on the development of membrane materials for aggressive sour gas separations. Embodiments of natural gas membrane separations of the present disclosure show surprising and unexpected advantages over commercially-available membranes, as aromatic block co-polyimides disclosed here provide superior efficiency, productivity, and resistance to penetrant-induced plasticization compared to cellulose acetate (CA), which is presently the industrial standard membrane material for $CO_2$ separations. Embodiments disclosed here show polyimide membrane gas separation applications suitable for acid or sour gas feed separations and helium recovery from especially sub-quality natural gas using aromatic co-polyimide membranes derived from a 6FDA-6FpDA-type homo-polyimide. In addition, embodiments show advantageous performance of the newly-developed membranes under extreme and much more aggressive environments (i.e. high $H_2S$ content of up to about 5 vol. %, about 10 vol. %, about 15 vol. %, and about 20 vol. % and feed pressures of up to about 400 psig, about 500 psig, about 600 psig, about 700 psig, and about 800 psig for a gas mixture comprising $CO_2$, $CH_4$, $N_2$, $C_2H_6$ and $H_2S$). Prior art membranes are generally suitable for separations at low concentrations of $H_2S$ and low feed pressures.

Aromatic polyimides of the present disclosure exhibit advantageous properties such as high thermal stability, chemical resistance, mechanical strength, and a low dielectric constant. These polymer properties, in part, allow polyimide membranes to withstand deterioration due to wet conditions often found with natural gas streams. Co-polyimides exemplified herein exhibit $CO_2/CH_4$ and $H_2S/CH_4$ ideal selectivities of about 24 and about 14 respectively; while $CO_2$ and $H_2S$ permeabilities are about 42 and about 24 Barrers respectively for block (6FDA-durene)/(6FDA-6FpDA) (1:4). Similarly for a random co-polyimide 6FDA-CARDO/6FpDA (1:3), $CO_2/CH_4$ and $H_2S/CH_4$ ideal selectivities are 17.8 and 17.9, respectively, while $CO_2$ and $H_2S$ permeabilities are 37.9 and 38 Barrers, respectively. This performance is significantly higher than those obtained in certain current commercial membranes. Moreover, the $CO_2/CH_4$ and $H_2S/CH_4$ selectivities of the co-polyimides do not degrade to anywhere near the same extent as was reported for CA and other commercial membranes, even under much more aggressive environments. This stability at moderate pressures and high $H_2S$ concentration is impressive and unique.

In embodiments of the present disclosure, with respect to random co-polyimides, a ratio (l:m) refers to a ratio of millimoles of a first non-FDA monomer: a second non-FDA monomer. With respect to block co-polyimides a ratio of (l:m) or (l)/(m) refers to either block length l to block length m or a ratio of block length l to m, for example as shown in the block copolymer of FIG. 1.

Here, a base homo-polyimide of 6FDA-6FpDA (2,2-bis (3,4-dicarboxyphenyl)-1,1,1,3,3,3-hexafluoropropane dianhydride-4,4'-(hexafluoroisopropylidene)dianiline) is combined with any one of or any combination of CARDO (9,9-bis(4-aminophenyl)fluorene); durene diamine (2,3,5,6-tetramethyl-1,4-phenylenediamine); ABL-21 (2,2'-bis(trifluoromethyl)benzidine); 3,3'-dihydroxybenzidine; and 3,3'-(hexafluoroisopropylidene)dianiline to make random or block co-polyimides which can be used as gas separation membranes in aggressive high pressure and high $H_2S$ concentration conditions.

6FDA-6FpDA-type aromatic co-polyimide membranes with advantageous pure and gas mixture permeation and selectivity properties are disclosed and exemplified for gas separations, particularly for sour gas feed separations and helium recovery from natural gas. The performance and qualities shown are unique, surprising, and unexpected compared to those obtained in the industrially-used glassy polymers and in other membranes. Moreover, the $CO_2/CH_4$ selectivity does not degrade or suffer significant loss similar to cellulose acetate (CA) (a commercial membrane) and other state of the art glassy polymers, even under the simulated industrial gas mixture environments used.

Polyimides of the present disclosure are promising materials for natural gas separations, particularly with sour gas, due to their chemical, thermal, and mechanical stability. Polyimide-based membranes have been characterized for gas separation applications, particularly for $CO_2$ removal from gaseous streams. $CO_2$ removal technologies can be applied in natural gas sweetening and carbon capture technologies. Membrane-based natural gas separations of the present disclosure are advantageous due to their lower capital cost, higher energy savings, smaller size, being environmentally friendly, and being more economically viable as compared to conventional technologies such as stand-alone pressure swing adsorption (PSA) and stand-alone absorption processes.

Fluorinated polyimides exhibit advantageous mechanical and chemical resistance and a high glass transition temperature, which enables use in harsh operating environments, such as natural gas sweetening process and helium recovery. Fluorinated functional groups on the polymer back bone ensure high resistance to the most common solvents, due, at least in part, to the low hydro-carbon solubility and polarity of perfluorinated materials. 6FDA-6FpDA exhibits a high $CO_2$ permeability and good selectivity with respect to $N_2$ and $CH_4$. Polymers exemplified here exhibit advantageous permeation properties for various gas pairs (e.g., $CO_2/CH_4$; $He/CH_4$; $N_2/CH_4$; and $H_2S/CH_4$). The polymers also exhibit chemical resistance, high mechanical strength, and high thermal stability. Since natural gas is usually treated at high pressures (up to 70 bar) and typically saturated with heavy hydrocarbons ($C_3$+) and water vapor, membranes of the present disclosure can be used for treating natural gas, at least in part, because of the properties described.

By using a 6FDA-6FpDA homo-polyimide to create co-polyimides of the present disclosure, for example with CARDO, durene, and/or other bulky diamines, the resulting membranes have the advantage of gas permeabilities and selectivities that cannot be obtained with homo-polyimides alone; and these membranes can be prepared from existing monomer units. In the case of exemplified block co-polymers, properties can be adjusted and directly controlled by changing the length and the ratio of the different blocks. The resulting co-polyimides can significantly improve gas separation properties without the need for heavy and costly synthetic modifications.

In hexafluorodianhydride ("6FDA")-based polyimides, for example produced using 4,4'-(Hexafluoroisopropylidene)diphthalic anhydride, the presence of a $CF_3$ group in the polymer results in chain stiffness, which causes certain membranes incorporating 6FDA to separate molecules based on steric bulk more effectively. The $CF_3$ group also leads to increased permeability due to inhibition of chain packing. As a result, 6FDA-based polyimides can exhibit greater selectivities and greater permeabilities that are within the same order of magnitude when compared to other high-performance polymers. As used herein throughout, the short-hand name of origin monomer units/moieties will be used to refer to final polymerized products, for example 6FDA-durene/CARDO, even though for example certain oxygen atoms of the anhydride groups of 6FDA have been substituted with nitrogen atoms (see, for example, FIG. 1).

Additionally, gas separation performance of polyimides can be enhanced through copolymerization with other homo-polyimides. Co-polyimides have an advantage of producing membranes with gas permeabilities and selectivities that cannot be obtained with homo-polyimides. The disclosure provides unique materials for gas separation membrane applications, particularly for acid and sour gas feed separations from natural gas. The resulting properties of the co-polyimides, for example permeability and selectivity to certain gases, are controllable by monomer selection and random versus block polymer design.

To minimize methane slippage, in some applications membranes need to exhibit consistent selectivities of $CO_2$/$CH_4$ and $H_2S$/$CH_4$ above 30 in wet sour gas with $H_2S$ concentration up to 20 mol. % at up to about 900 psig, and in the presence of $C_{3+}$ heavy hydrocarbons (about 3 mol. %) and in the presence of Benzene, Toluene, and Xylene (BTX) at about 1,000 ppm. Membranes should also exhibit consistent permeances of 100 GPU (gas permeation units) for $CO_2$ and $H_2S$ in the previously-described conditions.

Aromatic co-polyimides exemplified here provide superior efficiency, productivity and resistance to penetrant-induced plasticization compared to CA, which is presently the industrial standard membrane material for $CO_2$ separations. Membrane structures provided here withstand deterioration due to wet conditions often found with natural gas streams.

The (6FDA-durene)/(6FDA-6FpDA) (1:4) block co-polyimide membrane exhibits advantageous pure and gas mixture permeation properties, as the pure gas $CO_2$ and He permeabilities are about 65 and 125 Barrers, respectively, and $CO_2$/$CH_4$ and He/CH4 selectivities are about 47 and about 91, respectively, obtained at 35° C. and a feed pressure of 100 psig. Similarly, the random copolymer 6FDA-CARDO/6FpDA (1:3) exhibits advantageous separation performance, as the pure gas permeability values of about 79 and 110 Barrers for $CO_2$ and He, respectively, and $CO_2$/$CH_4$ and He/$CH_4$ selectivities of about 42 and 58, respectively, were obtained for the copolymer.

In addition, the permeation properties of quaternary gas mixtures consisting of 10, 59, 30 and 1 vol. % $CO_2$, $CH_4$, $N_2$ and $C_2H_6$, respectively, through the membranes show that $CO_2$ permeability and $CO_2$/$CH_4$ selectivity reduced to about 45 Barrers and about 39, respectively, for (6FDA-durene)/(6FDA-6FpDA) (1:4) block co-polyimide membrane at an elevated pressure of 800 psig. Furthermore, the permeation properties of simulated sour gas mixtures consisting of 10; 57-59; 10; 1-3; and 20 vol. % of $CO_2$, $CH_4$, $N_2$, $C_2H_6$ and $H_2S$, respectively, through the membrane were studied at different gas feed pressures. The $CO_2$/$CH_4$ and $H_2S$/$CH_4$ ideal selectivities obtained for the block (6FDA-durene)/(6FDA-6FpDA) (1:4) are about 24 and about 14, respectively, at 350 psig, while $CO_2$ and $H_2S$ permeabilities are 42 and about 24 Barrers, respectively. Similarly for the random co-polyimide 6FDA-CARDO/6FpDA (1:3), $CO_2$/$CH_4$ and $H_2S$/$CH_4$ ideal selectivities are about 17.8 and about 17.9, respectively, while $CO_2$ and $H_2S$ permeabilities are about 37.9 and about 38 Barrers, respectively.

The separation performance exhibited by the co-polyimides is surprising and unexpected, as well as advantageous as compared to values obtained in certain high performance polymeric membranes that have been reported in literature. Importantly, at moderate feed pressures and up to 20 vol. % $H_2S$ in the feed gas mixture, ideal selectivities and permeabilities are still suitable in the co-polyimides disclosed here. Moreover, the $CO_2$/$CH_4$ selectivity of the co-polyimides does not degrade to anywhere near the same extent as was reported for cellulose acetate (CA), even under much more aggressive environments.

The disclosed random and block aromatic co-polyimide membranes can be developed from a wide range of monomers including 4,4'-(hexafluoroisopropylidene) diphthalic dianhydride, also known as 2,2'-bis-(3,4-dicarboxyphenyl) hexafluoropropane dianhydride (6FDA); 9,9-bis(4-aminophenyl)fluorene (CARDO); 2,3,5,6-tetramethyl-1,4-phenylenediamine (durene diamine) and 4,4'-(hexafluoroisopropylidene)dianiline (6FpDA), forming random and block co-polymers of varying chain length, for example 6FDA-CARDO/6FpDA and 6FDA-durene/6FpDA co-polyimides.

In addition, the development of these aromatic co-polyimides can also include the use of other monomers, for example other diamines, that include 3,3'-dihydroxybenzidine, 2,2'-bis(trifluoromethyl)benzidine, and 3,3-(hexafluoroisopropylidene)dianiline. Example copolymers include, but are not limited to, 6FDA-durene/6FpDA (3:1); 6FDA-durene/6FpDA (1:1); 6FDA-durene/6FpDA (1:3); (6FDA-durene)/(6FDA-6FpDA) (1:1); (6FDA-durene)/(6FDA-6FpDA) (1:4); (6FDA-durene)/(6FDA-6FpDA) (1,000-20,000)/(1,000-20,000); 6FDA-CARDO/6FpDA (3:1); 6FDA-CARDO/6FpDA (1:1); 6FDA-CARDO/6FpDA (1:3); (6FDA-CARDO)/(6FDA-6FpDA) (1,000-20,000)/(1,000-20,000); (6FDA-durene)/(6FDA-6FpDA)/(6FDA-CARDO); (6FpDA-durene)/(6FpDA-CARDO)/(6FpDA-6FDA); and combination thereof.

Crosslinking of the polymers can be achieved using different types and sizing of functional groups. Examples include and are not limited to functionalization or grafting with polar or $H_2S$-philic groups, in addition to or alternative to $CO_2$-philic groups, including Bromine (Br); sulfonate or sulfonic acid ($SO_3H$); diallyl amine; acrylonitrile; jeffamines; and combinations thereof. Crosslinking can also be achieved using such cross-linkers such as N,N-dimethylpiperizine, p-xylenediamine, m-xylenediamine, aliphatic diamine, polyethyleneimine, and 1,3-cyclohexane-bis(methylamine), for example.

Therefore, disclosed here is a membrane for separating the components of a sour natural gas feed, the membrane comprising at least three distinct moieties polymerized together, the moieties including a 2,2'-bis(3,4-dicarboxyphenyl)hexafluoropropane dianhydride (6FDA) based moiety; a 4,4'-(hexafluoroisopropylidene)dianiline (6FpDA) based moiety; and at least one component selected from the group consisting of: a 9,9-bis(4-aminophenyl) fluorene (CARDO) based moiety; a 2,3,5,6-tetramethyl-1,4-phenylenediamine (durene diamine) based moiety; a 2,2'-bis(trifluoromethyl) benzidine (ABL-21) based moiety; a 3,3'-dihydroxybenzidine based moiety; and a 3,3'-(hexafluoroisopropylidene) dianiline based moiety. In some embodiments, the membrane comprises random co-polymers. In other embodiments, the membrane comprises the CARDO based moiety. Still in other embodiments, the molar ratio of the CARDO based moiety to the 6FpDA based moiety is between about 1:3 to about 3:1. In certain embodiments, the membrane comprises the durene diamine based moiety.

In some embodiments of the membrane, the molar ratio of the durene diamine based moiety to the 6FpDA based moiety is between about 1:3 to about 3:1. Still in other embodiments, the membrane comprises block co-polymers. In certain embodiments, the membrane comprises the CARDO based moiety. In some embodiments, the membrane comprises the durene diamine based moiety. Still in other embodiments, the block co-polymers include a polymer block length L of the 6FDA and the durene diamine based moiety, and include a polymer block length M of the 6FDA and the 6FpDA based moiety, and L is about between 1,000-20,000 units and M is about between 1,000-20,000 units. Still in other embodiments, the block ratio of L:M is between about 1:1 and about 1:4. In certain embodiments, L is about 2,500 units and M is about 2,500 units. In some embodiments, L is about 5,000 units and M is about 5,000 units. Still in other embodiments, L is about 15,000 units and M is about 15,000 units.

Additionally disclosed here is a method of gas separation, the method comprising the step of: applying the membrane, either block or random, to separate at least 2 components of a mixed gas stream. In some embodiments of the method, feed pressure of the mixed gas stream to a feed side of the membrane is up to about 500 psig, 800 psig, or 900 psig, and $H_2S$ content of the mixed gas stream is up to about 20 volume percent. In some embodiments of the method, the mixed gas stream comprises $CO_2$, $CH_4$, $N_2$, $C_2H_6$, and $H_2S$.

Additionally disclosed here is a method for making a membrane for separating components of a sour natural gas feed, the method comprising the steps of combining at least three different monomers to form a co-polyimide, the monomers including 2,2'-bis(3,4-dicarboxyphenyl)hexafluoropropane dianhydride (6FDA); 4,4'-(hexafluoroisopropylidene)dianiline (6FpDA); and at least one component selected from the group consisting of: 9,9-bis(4-aminophenyl) fluorene (CARDO); a 2,3,5,6-tetramethyl-1,4-phenylenediamine (durene diamine); 2,2'-bis(trifluoromethyl) benzidine (ABL-21); 3,3'-dihydroxybenzidine; and 3,3'-(hexafluoroisopropylidene)dianiline; and preparing a dense film from the co-polyimide using a solution casting process.

In some embodiments, the method includes the step of using the dense film to separate components of a gas stream. In some embodiments of the method, the step of combining is carried out to create random co-polymers. Still in other embodiments, the step of combining includes combining the 6FDA, the 6FpDA, and the CARDO. In certain embodiments, the molar ratio of the CARDO to the 6FpDA is between about 1:3 to about 3:1. In some embodiments, the step of combining includes combining the 6FDA, the 6FpDA, and the durene diamine. In some embodiments, the molar ratio of the durene diamine to the 6FpDA is between about 1:3 to about 3:1. Still in other embodiments, the step of combining is carried out to create block co-polymers. In some embodiments, the step of combining includes combining the 6FDA, the 6FpDA, and the CARDO. In certain embodiments, the step of combining includes combining the 6FDA, the 6FpDA, and the durene diamine. Still in other embodiments, the block co-polymers include a polymer block length L of the 6FDA and the durene diamine and include a polymer block length M of the 6FDA and the 6FpDA, and L is between about 1,000-20,000 units and M is between about 1,000-20,000 units. And in certain embodiments, the block ratio of L:M is between about 1:1 and about 1:4.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
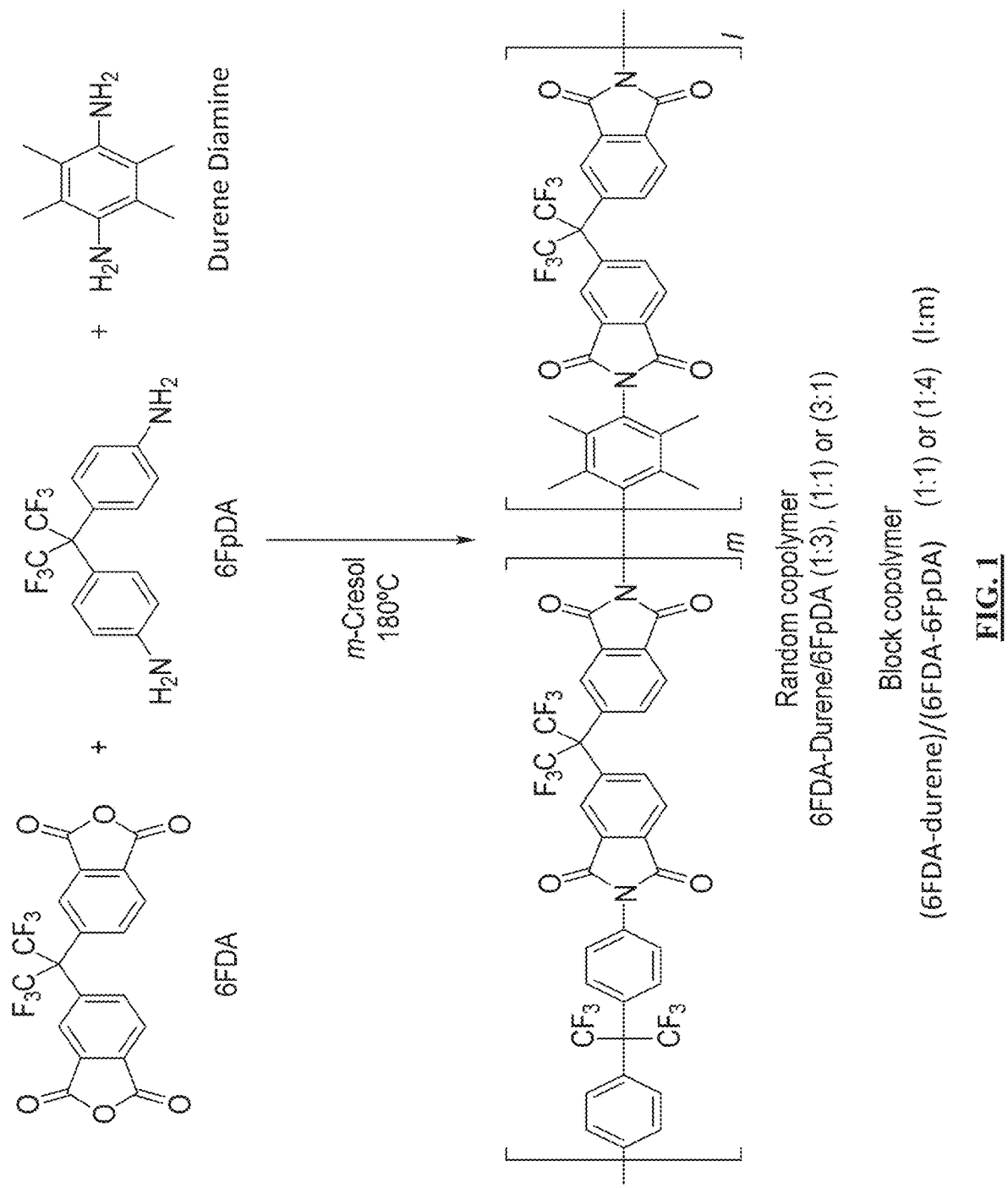
FIG. 1 is a reaction scheme for the production of a random or block copolymer from 6FDA, 6FpDA, and durene diamine.

So that the manner in which the features and advantages of the embodiments of apparatus, systems, and methods for 6FDA-6FpDA homo-polyimide-based co-polyimide membranes for sour gas feed separations from natural gas, as well as others, which will become apparent, may be understood in more detail, a more particular description of the embodiments of the present disclosure briefly summarized previously may be had by reference to the various embodiments, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The present disclosure exemplifies co-polyimide membranes useful for acid gas separations and helium recovery. In order to enhance separation performance and optimize co-polyimides for gas separations, chemical modifications can be made, which include substitution of other pertinent moieties and bulky functional groups in the co-polyimide backbone. These modification steps can significantly improve the performance of co-polyimide membranes. Thus, the development of aromatic co-polyimides can be considered from other monomers with and without, or in the absence of, crosslinking.

Transport properties of pure gases and gas mixtures through dense polymeric membranes are governed by the solution-diffusion mechanism. According to this model, gas permeation follows a three-step process, which is gas dissolution in the upstream side of the membrane, diffusion down a concentration gradient through the membrane, and desorption from the downstream side of the membrane. From this, the volumetric (molar) flux of a component i, $J_i$, through the membrane is given by equation (1)

$$J_i = \frac{D_i S_i (p_i(o) - p_{i(l)})}{l} = \frac{P_i (p_i(o) - p_{i(l)})}{l} \quad \text{Eq. (1)}$$

where $l$ is membrane thickness [cm], $p_{i(o)}$ is the partial pressure of component i at the feed side of the membrane, $p_{i(l)}$ is the partial pressure of component i at permeate side, $D_i$ is the diffusion coefficient [cm$^2$/s], $S_i$ is the solubility coefficient [cm$^3$ (STP) of penetrant gas/cm$^3$ of polymer per pressure]. The product of diffusion and solubility coefficients ($D_i$ $S_i$) is called the membrane permeability of component i, $P_i$, which indicates the ability of a membrane to permeate gases based on their membrane solubility and diffusivity differences. Barrer is the conventional unit of permeability, where 1 Barrer=$10^{-10}$ (cm$^3$(STP)×cm)/(cm$^2$×s×cmHg).

The pure gas permeability coefficient, especially at low pressures, can be calculated using equation 2.

$$P_i = D_i S_i = \frac{j_i \cdot l}{p_i(o) - p_{i(l)}} \quad \text{Eq. (2)}$$

The permeability coefficient of each gas component in the gas mixture, especially at low pressures, can be determined from the equation 3.

$$P_i = \frac{x_{i(l)} J_i \cdot l}{(P_f x_{i(o)} - P_p x_{i(l)})} \quad \text{Eq. (3)}$$

where $x_{i(o)}$ and $x_{i(l)}$ are the mole fractions of the gas components in the feed and permeate streams respectively, $J_i$ is the volumetric (molar) flux of a component i (cm$^3$/(cm$^2$×s)), and $p_f$ and $p_p$ are the pressures (cmHg absolute) on the feed and permeate side of the membrane respectively.

The ability of the membrane to separate two components is called the ideal selectivity or permselectivity, $\alpha_{ij}$, which is represented by the ratio of permeability of the more permeable component i to that of the less permeable component j through the membrane as shown in equation (4).

$$\alpha_{ij} = \frac{P_i}{P_j} = \frac{S_i}{S_j} \times \frac{D_i}{D_j} \quad \text{Eq. (4)}$$

where $$\frac{S_i}{S_j} \text{ and } \frac{D_i}{D_j}$$

and are the solubility selectivity and diffusivity selectivity of two gases, respectively. These terms represent the relative solubility and mobility of two gases in the membrane.

In a gas mixture, however, the separation factor, $\alpha^m_{ij}$, is often used, which is typically used to measure separation efficiency and this is conventionally given as equation (5):

$$\alpha^m_{ij} = \frac{x_{i(l)}/x_{j(l)}}{x_{i(o)}/x_{j(o)}} \quad \text{Eq. (5)}$$

where $x_{i(o)}$ and $x_{i(l)}$ are the mole fractions of the gas component i in the feed and permeate streams respectively; and $x_{j(o)}$ and $x_{j(l)}$ are the mole fractions of the gas component j in the feed and permeate streams respectively. For non-ideal gas mixtures, however, a more appropriate alternative measure of permselectivity is used to reflect the properties of the membrane material, $\alpha^{m,*}_{ij}$. This permselectivity is the ratio of the mixed gas permeabilities of components i and j, as determined using the fugacity driving force definition of permeability. Thus $$\alpha_{i/j}^{m,*} = \frac{P_i^*}{P_j^*} \qquad \text{Eq. (6)}$$

where $P_i^*$ and $P_j^*$ are the mixed gas fugacity-based permeabilities of component i and j. Equation (6) is used in this study to calculate the permselectivity of each component in the gas mixtures. The permeation properties of gases through dense polymeric membranes are also affected by variation in operating temperatures and its influence can be described by Van't Hoff-Arrhenius equation as given below in equation (7).

$$P = P_0 \exp\left(\frac{-E_p}{RT}\right) \qquad \text{Eq. (7)}$$

$P_0$ is the pre-exponential factor [Barrer], R is the universal gas constant [$8.314 \times 10^{-3}$ kJ/(mol×K)], T is the absolute temperature [K], and $E_p$ is the activation energy of permeation [kJ/mol].

Embodiments of the disclosure show the preparation of aromatic co-polyimide membranes derived from 6FDA-6FpDA homo-polyimide and other monomers, such as durene and CARDO moieties. In addition, physical and gas transport properties of the membranes are examined by investigating separations of pure and mixed gas streams consisting of $CO_2$, $CH_4$, $N_2$, $C_2H_6$, He and $H_2S$ through the dense films of the co-polyimides 6FDA-durene/6FpDA and 6FDA-CARDO/6FpDA for simultaneous separation of $CO_2$, $N_2$, He and $H_2S$ from natural gas streams.

Example 1 shows synthesis of certain random and block co-polyimides from 6FDA, 6FpDA, and durene diamine. Example 2 shows synthesis of certain random co-polyimides from 6FDA, 6FpDA, and CARDO. Examples 3-5 test the properties of these random and block co-polyimides acting as membranes for aggressive natural gas separation. Table 3 for example shows high permeability and selectivity of the membranes for non-methane components of a natural gas stream.

The following examples are given for the purpose of illustrating embodiments of the invention, however, it is to be understood that these examples are merely illustrative in nature, and that the embodiments of the present invention are not necessarily limited thereto.

Example 1: Preparation of Aromatic Co-Polyimide Random 6FDA-Durene/6FpDA and Block (6FDA-Durene)/(6FDA-6FpDA)

Series of random and block aromatic co-polyimides comprising 6FDA, durene diamine, and 6FpDA based-moieties (see for example FIG. 1) were synthesized according to the following procedures from 2,2'-bis-(3,4-dicarboxyphenyl) hexafluoropropane dianhydride (6FDA) (also known as 4,4'-(Hexafluoroisopropylidene) diphthalic anhydride) (obtained from Alfa Aesar); 2,3,5,6-tetramethyl-1,4-phenylenediamine (durene diamine) (obtained from TCI America); and 4,4'-(hexafluoroisopropylidene) dianiline (6FpDA) (obtained from TCI America). Solvents used included methanol (obtained from ThermoFisher Scientific) and m-cresol (obtained from Alfa Aesar). All the chemicals and the solvents used in the experiments discussed here were used as received without any further purification. In block co-polyimides of the present disclosure block length (l)/(m) in FIG. 1 can be about between (1,000-20,000)/(1,000-20,000), and a block ratio of l:m can be between about 4:1 to about 1:4, for example about 1:1.

A random co-polyimide 6FDA-durene/6FpDA (1:1) (millimoles durene diamine:millimoles 6FpDA) (I) was synthesized as follows: In a 100-mL three-neck round bottom flask equipped with a nitrogen inlet and a mechanical stirrer, durene diamine (1.849 g, 11.26 mmol); 6FpDA (3.76 g, 11.26 mmol); and 6FDA (10.0 g, 22.51 mmol) were dissolved in m-cresol (19.00 ml). The mixture was heated at 180° C. for 8 hours (see FIG. 1). The volume was kept constant at 19.00 ml with m-cresol during the course of the reaction. The resulting viscous solution was poured into methanol (400 mL). The solid polymer obtained was stirred in methanol overnight, then filtered and dried partially. The washing process was repeated twice (2×400 mL of methanol). A final white off-solid product 6FDA-durene/6FpDA (14.38 g, 10.69 mmol, 95% yield) was filtered off then dried under reduced pressure at 150° C. for two days. Characterization resulted in the following: $\delta_H$ (500 MHz, $CDCl_3$) 8.10-8.06 (4H, m, $ArH_{6FDA}$), 7.98 (6H, br s, $ArH_{6FDA}$), 7.89 (2H, br d, J=7.45 Hz, $ArH_{6FDA}$), 7.60 (4H, d, J=6.87 Hz, $ArH_{6FpDA}$), 7.54 (4H, d, J=8.02 Hz, $ArH_{6FpDA}$), 2.13 (12H, s, $-CH_{3\,durene}$).

A random co-polyimide 6FDA-durene/6FpDA (1:3) (millimoles durene diamine:millimoles 6FpDA) (II) was synthesized as follows: A similar procedure for preparing co-polyimide (I) was employed using the following starting materials and amounts: durene diamine (0.819 g, 4.99 mmol), 6FpDA (5.00 g, 14.96 mmol), and 6FDA (8.86 g, 19.94 mmol) in m-cresol (19.00 ml). The final product 6FDA-durene/6FpDA (1:3) (II) (12.61 g, 9.37 mmol, 94% yield) was obtained as a white off-solid product. Characterization of the product resulted in the following: $\delta_H$ (500 MHz, $CDCl_3$) 8.10-8.06 (3H, m, $ArH_{6FDA}$), 7.98 (3H, br s, $ArH_{6FDA}$), 7.89 (2H, br d, J=7.45 Hz, $ArH_{6FDA}$), 7.60 (4H, d, J=8.02 Hz, $ArH_{6FpDA}$), 7.54 (4H, d, J=8.59 Hz, $ArH_{6FpDA}$), 2.12 (4H, s, $-CH_{3\,durene}$).

A random co-polyimide 6FDA-durene/6FpDA (3:1) (millimoles durene diamine:millimoles 6FpDA) (III) was synthesized as follows: A similar procedure for preparing co-polyimide (I) was employed using the following starting materials and amounts: durene diamine (2.77 g, 16.88 mmol), 6FpDA (1.881 g, 5.63 mmol) and 6FDA (10.0 g, 22.51 mmol) m-cresol (19.00 ml). The final product 6FDA-durene/6FpDA (3:1) (III) (14.38 g, 10.69 mmol, 95% yield) was obtained as a white off-solid product. Characterization of the product resulted in the following: $\delta_H$ (500 MHz, $CDCl_3$) 8.09-8.05 (8H, m, $ArH_{6FDA}$), 7.98-7.96 (14H, m, $ArH_{6FDA}$), 7.89 (2H, br d, J=7.45 Hz, $ArH_{6FDA}$), 7.60 (4H, d, J=7.45 Hz, $ArH_{6FpDA}$), 7.55 (4H, d, J=8.02 Hz, $ArH_{6FpDA}$), 2.13 (36H, s, $-CH_{3\,durene}$).

A block co-polyimide (6FDA-durene)/(6FDA-6FpDA) (1:1) (IV) was synthesized as follows: In a 100 mL three-neck round bottom flask equipped with a nitrogen inlet and a mechanical stirrer, 6FpDA (5.01 g, 15.00 mmol) was dissolved in m-cresol (13.00 ml), then 6FDA (5.66 g, 12.74 mmol) was added with m-cresol (12.00 ml). The mixture was heated at 180° C. for 8 hours. The amount of m-cresol was kept constant during the course of the reaction. Later, the mixture was cooled to room temperature and durene diamine (2.76 g, 16.83 mmol), 6FDA (8.48 g, 19.09 mmol), and m-cresol (25.00 ml) were added. The mixture was heated again at 180° C. during 8 hours. The amount of m-cresol was kept constant during the course of the reaction. While still hot, the resulting viscous solution was poured into 400 mL of methanol in thin fibers/powder. The solid was stirred in methanol overnight. This procedure was repeated twice (2×400 mL methanol) over two days. Finally, the white off-solid product was filtered and dried at 150° C. under vacuum for two days to afford the final product block co-polyimide (6FDA-durene)/(6FDA-6FpDA) (21.50 g, 15.99 mmol, 95% yield). Characterization of the product resulted in the following: $\delta_H$ (500 MHz, CDCl$_3$) 8.09-8.06 (4H, m, ArH$_{6FDA}$), 7.97 (6H, br s, ArH$_{6FDA}$), 7.89 (2H, br d, J=7.45 Hz, ArH$_{6FDA}$), 7.60 (4H, d, J=8.02 Hz, ArH$_{6FpDA}$), 7.54 (4H, d, J=8.54 Hz, ArH$_{6FpDA}$), 2.13 (12H, s, —CH$_{3durene}$).

A block co-polyimide (6FDA-durene)/(6FDA-6FpDA) (1:4) (V) was synthesized as follows: A similar procedure for preparing co-polyimide (IV) was employed using the following starting materials and amounts: 6FpDA (4.3 g, 12.86 mmol) and 6FDA (5.44 g, 12.24 mmol) were mixed in m-cresol (11.00 mL and 10.00 mL, respectively). Then, durene diamine (0.703 g, 4.28 mmol) and 6FDA (2.150 g, 4.84 mmol) were mixed in m-cresol (25.00 ml). The final product (6FDA-durene)/(6FDA-6FpDA) (1:4) (V) (11.67 g, 0.583 mmol, 95% yield) was obtained as a white off-solid product. The product was characterized as follows: $\delta_H$ (500 MHz, CDCl$_3$) 8.07 (3H, d, J=8.02 Hz, ArH$_{6FDA}$), 7.97 (3H, s, ArH$_{6FDA}$), 7.89 (2H, d, J=7.45 Hz, ArH$_{6FDA}$), 7.60 (4H, d, J=8.02 Hz, ArH$_{6FpDA}$), 7.53 (4H, d, J=8.59 Hz, ArH$_{6FpDA}$), 2.13 (3H, s, —CH$_{3durene}$).

Example 2: Preparation of Aromatic Random Co-Polyimide 6FDA-CARDO/6FpDA

Figure 2:
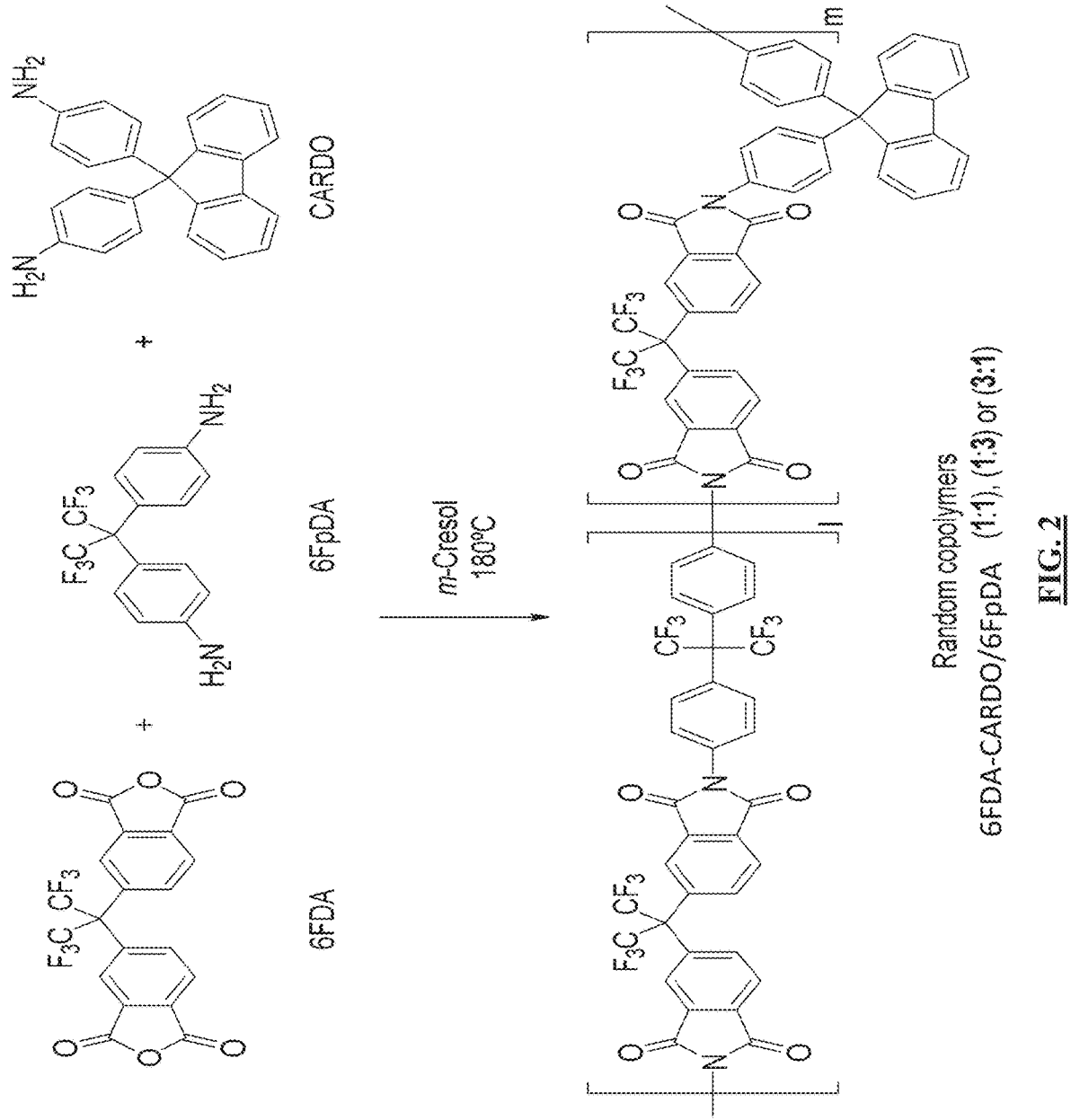
FIG. 2 is a reaction scheme for the production of a random copolymer from 6FDA, 6FpDA, and CARDO.

Series of random aromatic 6FDA-CARDO/6FpDA co-polyimides (see for example FIG. 2) were synthesized according to the following procedures from 2,2'-bis-(3,4-dicarboxyphenyl) hexafluoropropane dianhydride (6FDA) (also known as 4,4'-(Hexafluoroisopropylidene) diphthalic anhydride) (obtained from Alfa Aesar); 9,9-bis(4-aminophenyl) fluorene (CARDO) (obtained from TCI America); and 4,4'-(hexafluoroisopropylidene) dianiline (6FpDA) (obtained from TCI America). The solvents used included methanol (ThermoFisher Scientific) and m-cresol (Alfa Aesar). All the chemicals and the solvents used in this work were used as received without any further purification.

A random co-polyimide 6FDA-CARDO/6FpDA (1:1) (millimoles CARDO:millimoles 6FpDA) (VI) was synthesized according to the following: In a 100-mL three-neck round bottom flask equipped with a nitrogen inlet and a mechanical stirrer, 6FpDA (1.500 g, 4.49 mmol), CARDO (1.564 g, 4.49 mmol), and 6FDA (3.99 g, 8.98 mmol) were suspended in m-cresol (21 ml). The reaction mixture was heated at 180° C. for 8 hours. The amount of m-cresol was kept constant during the course of the reaction. The resulting viscous solution was poured into methanol (400 mL). The solid polymer obtained was stirred in methanol overnight, then filtered and dried partially. This washing process was repeated twice (2×400 mL of methanol). The final white off-solid product 6FDA-6FpDA/CARDO (1:1) (6.52 g, 4.26 mmol, 95% yield) was filtered off then dried under reduced pressure at 150° C. for two days. The product was characterized as follows: $\delta_H$ (500 MHz, CDCl$_3$) 8.07-7.82 (12H, m, ArH$_{6FDA}$), 7.79 (2H, d, J=7.79 Hz, ArH$_{CARDO}$), 7.60-7.53 (8H, AB system, J=7.59 Hz, ArH$_{6FDA}$), 7.45 (2H, d, J=7.45 Hz, ArH$_{CARDO}$), 7.39-7.30 (12H, m, ArH$_{CARDO}$).

A random co-polyimide 6FDA-CARDO/6FpDA (3:1) (millimoles CARDO:millimoles 6FpDA) (VII) was synthesized as follows: A similar procedure for preparing co-polyimide (VI) was employed using the following starting materials and amounts: 6FpDA (1.000 g, 2.99 mmol), CARDO (3.13 g, 8.98 mmol), and 6FDA (5.32 g, 11.97 mmol) in m-cresol (28.00 ml). The final product 6FDA-CARDO/6FpDA (3:1) (VII) (8.69 g, 5.68 mmol, 95% yield) was obtained as a white off-solid product. The product was characterized as follows: $\delta_H$ (500 MHz, CDCl$_3$) 8.05-7.82 (8H, m, ArH$_{6FDA}$), 7.78 (2H, d, J=7.79 Hz, ArH$_{CARDO}$), 7.60-7.52 (2.69H, AB system, J=7.59 Hz, ArH$_{6FDA}$), 7.45 (2H, d, J=7.45 Hz, ArH$_{CARDO}$), 7.38-7.29 (12H, m, ArH$_{CARDO}$).

A random co-polyimide 6FDA-CARDO/6FpDA (1:3) (millimoles CARDO:millimoles 6FpDA) (VIII) was synthesized as follows: A similar procedure for preparing co-polyimide (VI) was employed using the following starting materials and amounts: 6FpDA (4.32 g, 12.91 mmol), CARDO (1.500 g, 4.30 mmol), and 6FDA (7.65 g, 17.22 mmol) in m-cresol (40.00 ml). The final product 6FDA-CARDO/6FpDA (1:3) (VIII) (12.76 g, 8.34 mmol, 97% yield) was obtained as a white off-solid product. The product was characterized as follows: $\delta_H$ (500 MHz, CDCl$_3$) 8.07-7.84 (8H, m, ArH$_{6FDA}$), 7.78 (0.67H, d, J=7.79 Hz, ArH$_{CARDO}$), 7.60-7.53 (8H, AB system, J=7.59 Hz, ArH$_{6FDA}$), 7.45 (0.67H, d, J=7.45 Hz, ArH$_{CARDO}$), 7.39-7.30 (4H, m, ArH$_{CARDO}$).

Figure 3A:
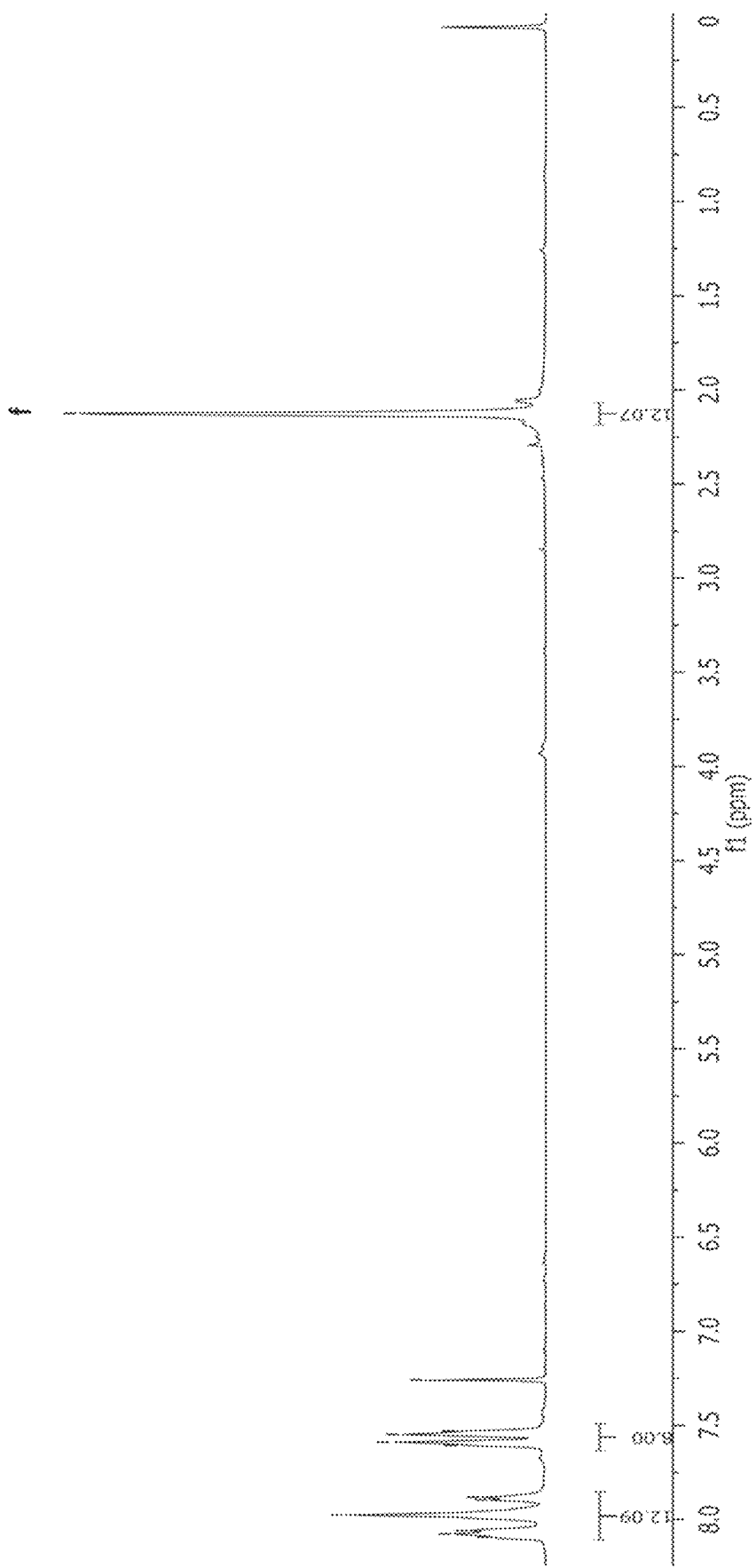
FIG. 3A shows the $^1H$ NMR spectrum of random co-polyimide 6FDA-durene/6FpDA (1:1) (millimoles durene diamine:millimoles 6FpDA) as a model spectrum for the exemplified co-polyimides.
Figure 3B:
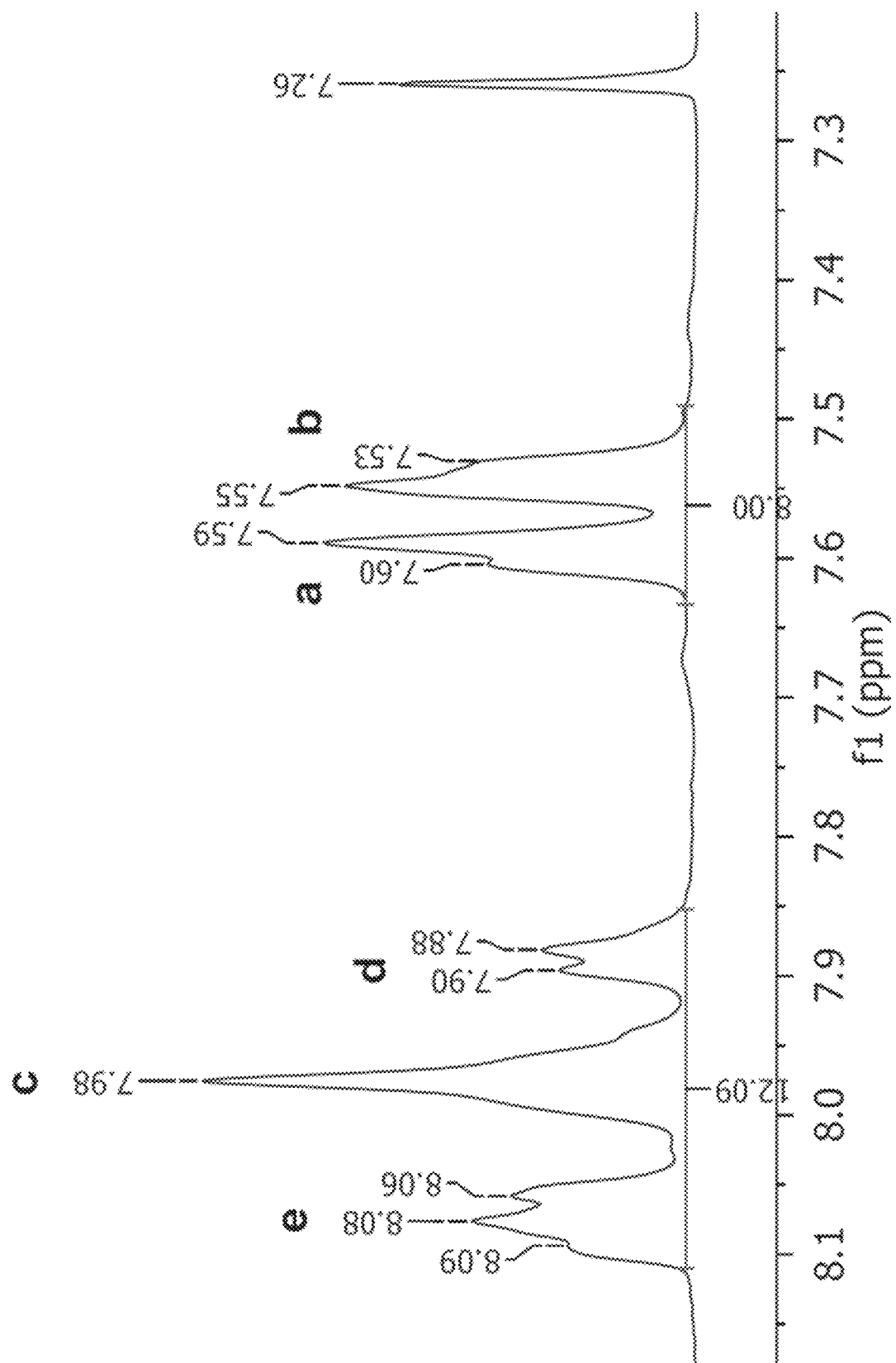
FIG. 3B shows an enlarged portion from FIG. 3A for the $^1H$ NMR spectrum of random co-polyimide 6FDA-durene/6FpDA (1:1) as a model spectrum for the exemplified co-polyimides.
Figure 3C:
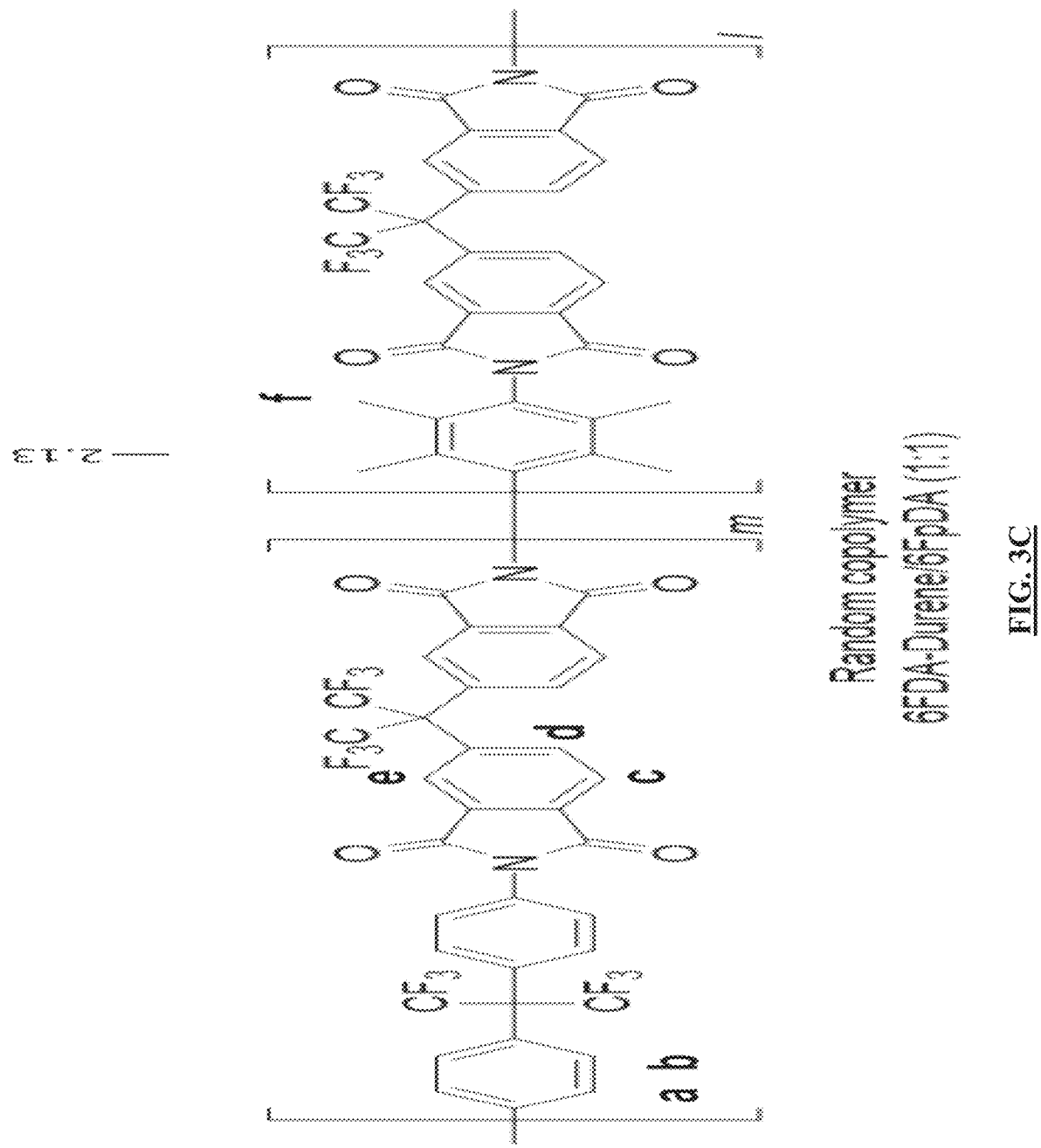
FIG. 3C shows the molecule characterized by the analysis of FIGS. 3A and 3B. The reference letters in FIG. 3C correspond to the identification peaks shown in FIGS. 3A and 3B.

The chemical structures of the prepared co-polyimides were confirmed by $^1$H nuclear magnetic resonance (NMR) analysis in deuterated chloroform (CDCl$_3$). FIG. 3A shows the $^1$H NMR spectrum of random co-polyimide 6FDA-durene/6FpDA (1:1) (millimoles durene diamine:millimoles 6FpDA) as a model spectrum for the exemplified co-polyimides. FIG. 3B shows an enlarged portion from FIG. 3A for the $^1$H NMR spectrum of random co-polyimide 6FDA-durene/6FpDA (1:1) as a model spectrum for the exemplified co-polyimides. FIG. 3C shows the co-polyimide molecule characterized by the analysis of FIGS. 3A and 3B. The reference letters in FIG. 3C correspond to the identification peaks shown in FIGS. 3A and 3B. The spectrum shows the presence of the corresponding peaks of 6FpDA (a and b), 6FDA (c, d, and e) and durene (f).

Figure 4A:
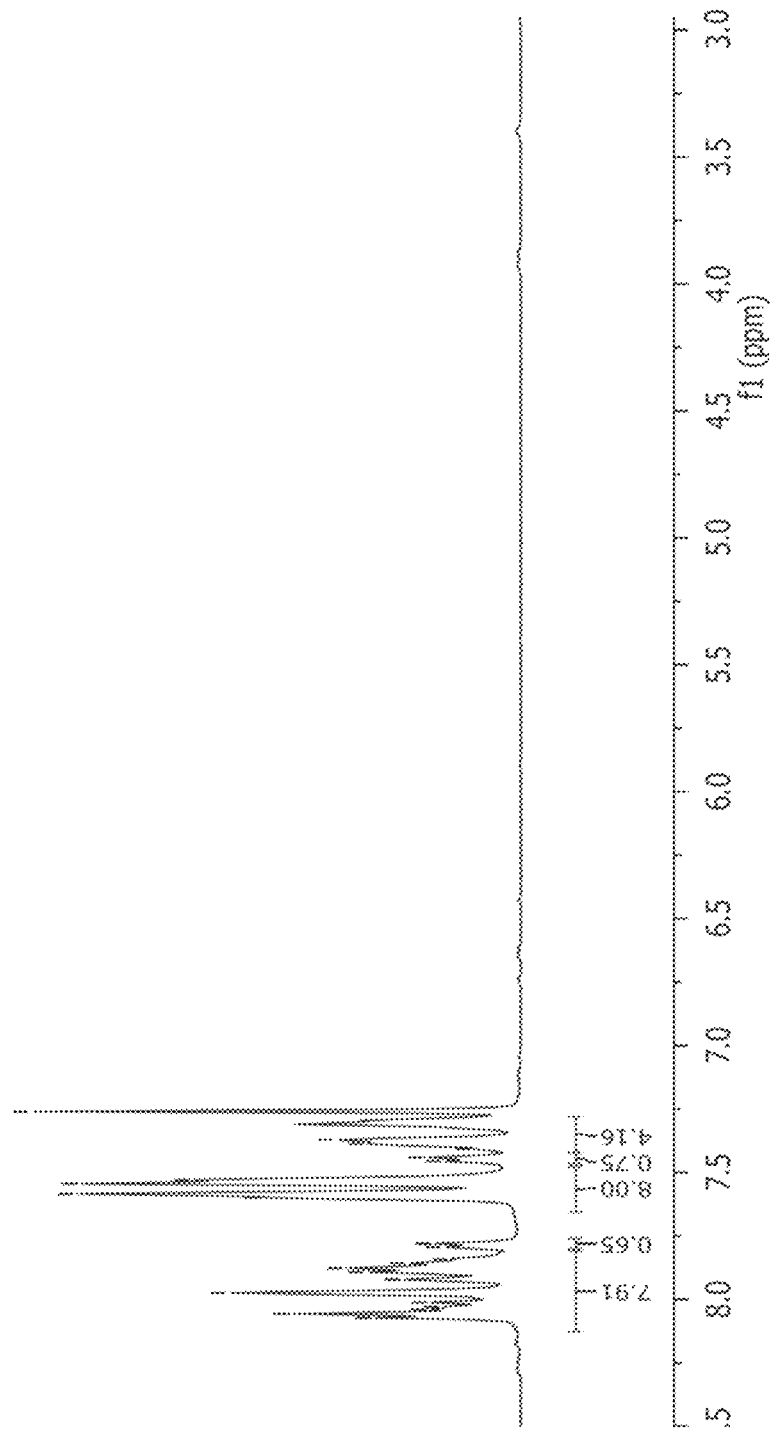
FIG. 4A shows the $^1H$ NMR spectrum of random co-polyimide 6FDA-CARDO/6FpDA (1:3) (millimoles CARDO:millimoles 6FpDA) as a model spectrum for the exemplified co-polyimides.
Figure 4B:
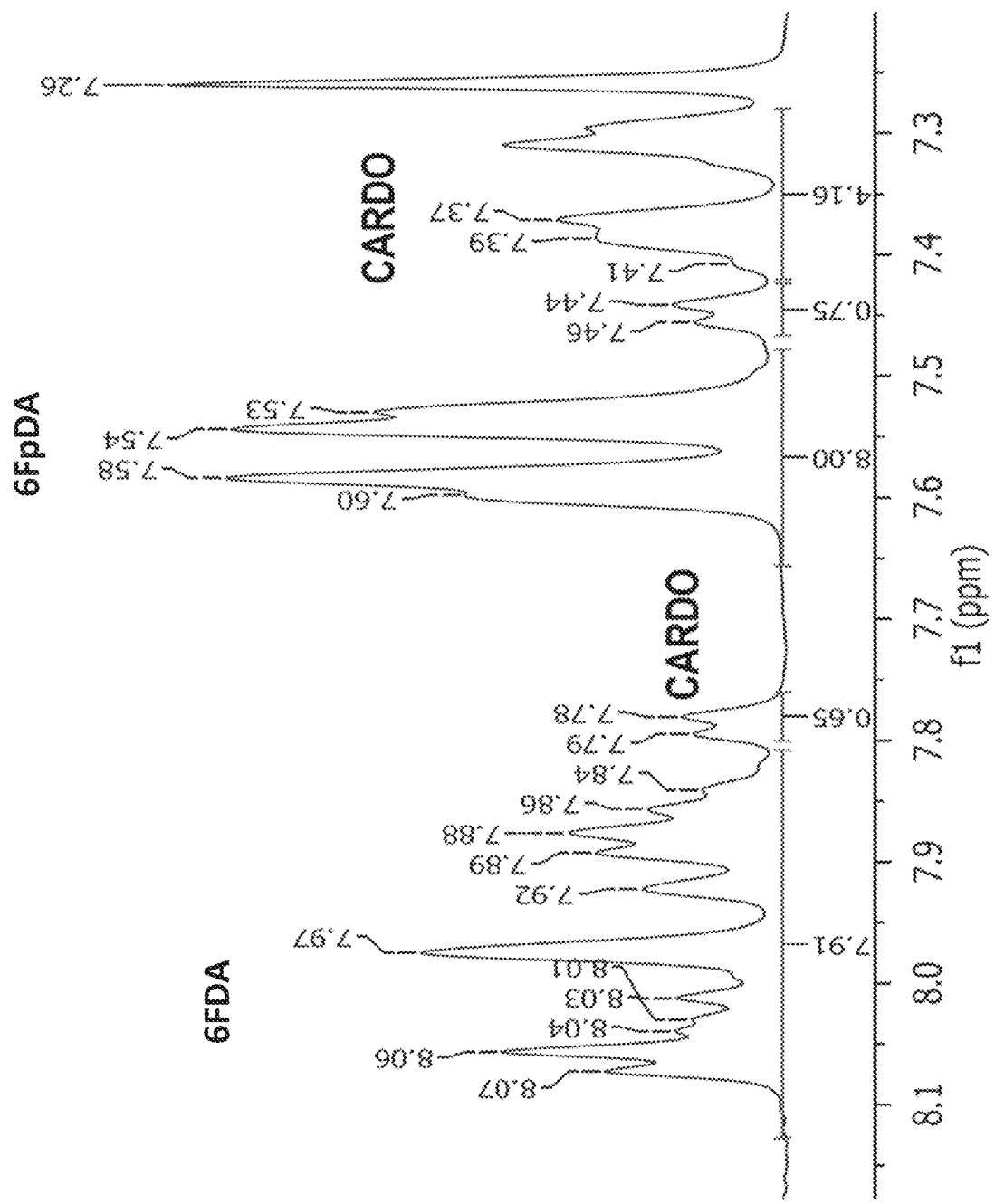
FIG. 4B shows an enlarged portion from FIG. 4A for the $^1H$ NMR spectrum of random co-polyimide 6FDA-CARDO/6FpDA (1:3) as a model spectrum for the exemplified co-polyimides.
Figure 4C:
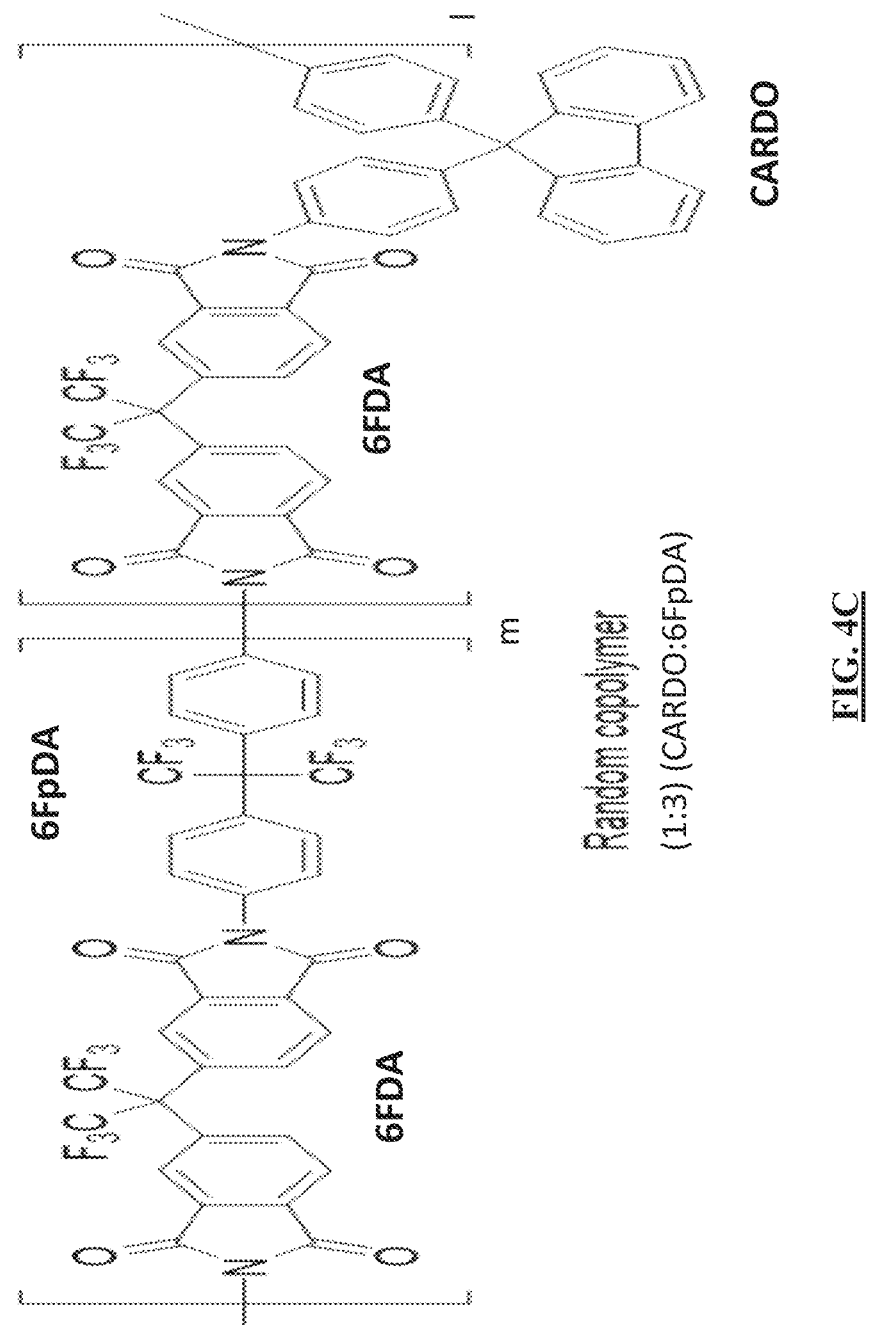
FIG. 4C shows the molecule characterized by the analysis of FIGS. 4A and 4B. The moiety references in FIG. 4C correspond to the identification peaks shown in FIG. 4B.

FIG. 4A shows the $^1$H NMR spectrum of random co-polyimide 6FDA-CARDO/6FpDA (1:3) (millimoles CARDO:millimoles 6FpDA) as a model spectrum for the exemplified co-polyimides. FIG. 4B shows an enlarged portion from FIG. 4A for the $^1$H NMR spectrum of random co-polyimide 6FDA-CARDO/6FpDA (1:3) as a model spectrum for the exemplified co-polyimides. FIG. 4C shows the molecule characterized by the analysis of FIGS. 4A and 4B. The moiety references in FIG. 4C correspond to the identification peaks shown in FIG. 4B. The $^1$H NMR spectrum of this co-polymer confirms the 1:3 molar ratio of CARDO:6FpDA through the signal integration of their corresponding signals. For a sum of 8 protons corresponding to the 6FpDA hydrogen atoms it was found a sum of around 5.3 protons corresponding to the CARDO hydrogen atoms which represents one third of the 16 protons found in a CARDO moiety.

Figure 11:
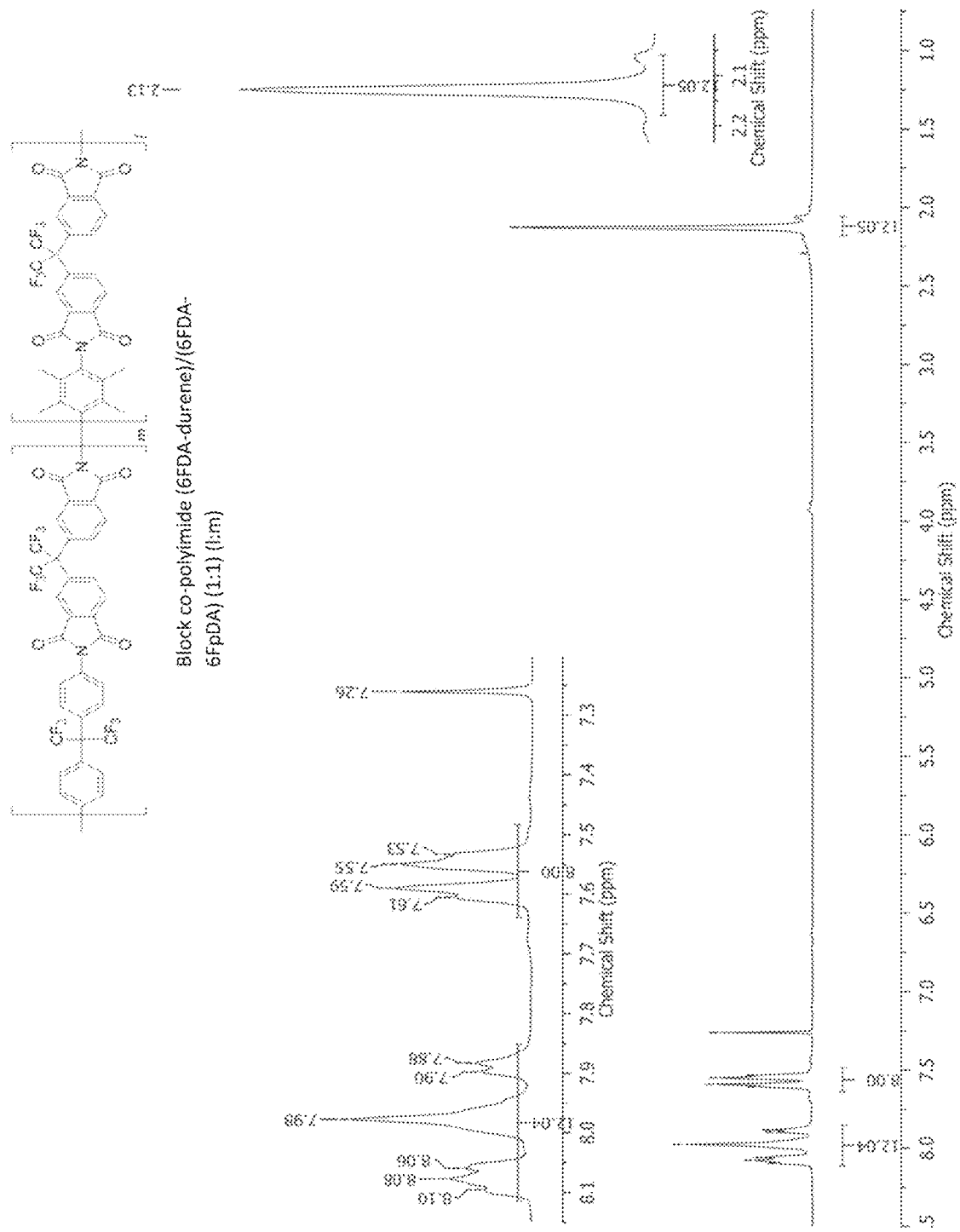
FIG. 11 shows the $^1$H NMR spectrum of block co-polyimide (6FDA-durene)/(6FDA-6FpDA) (1:1).
Figure 12:
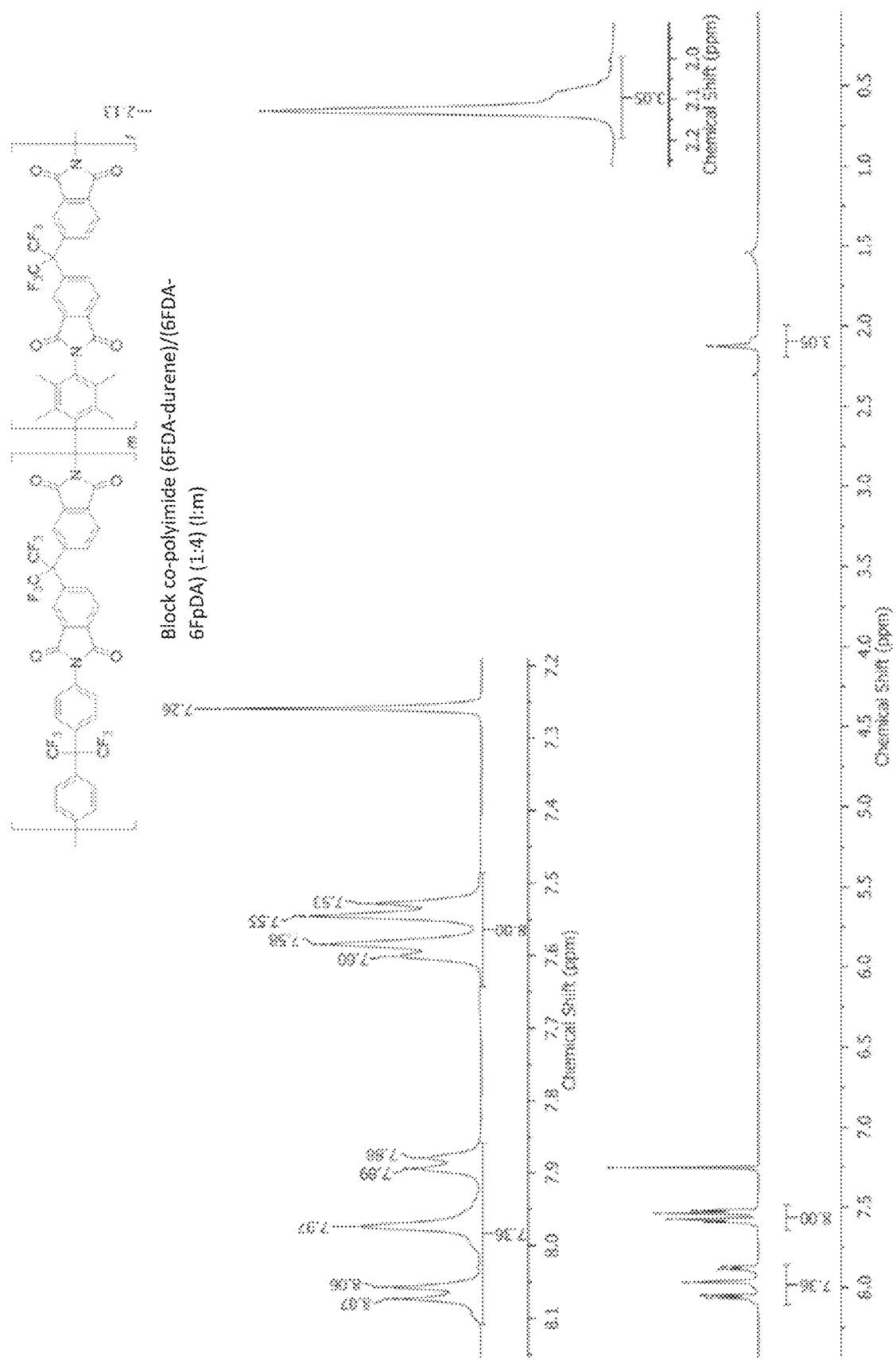
FIG. 12 shows the $^1$H NMR spectrum of block co-polyimide (6FDA-durene)/(6FDA-6FpDA) (1:4).

FIG. 11 shows the $^1$H NMR spectrum of block co-polyimide (6FDA-durene)/(6FDA-6FpDA) (1:1). FIG. 12 shows the $^1$H NMR spectrum of block co-polyimide (6FDA-durene)/(6FDA-6FpDA) (1:4). The block ratios were confirmed by the corresponding $^1$H NMR in deuterated chloroform. For the (6FDA-durene)/(6FDA-6FpDA) ratio of (1:1), the signal integration of aromatic protons of 6FpDA shown at 7.61 to 7.53 ppm and the aliphatic protons of duene shown at 2.13 ppm correspond to 8 and 12 protons, respectively. However, for the (6FDA-durene)/(6FDA-6FpDA) ratio of (1:4), the signal integration corresponding to 6FpDA and durene are 8 and 3 protons, respectively.

Figure 5:
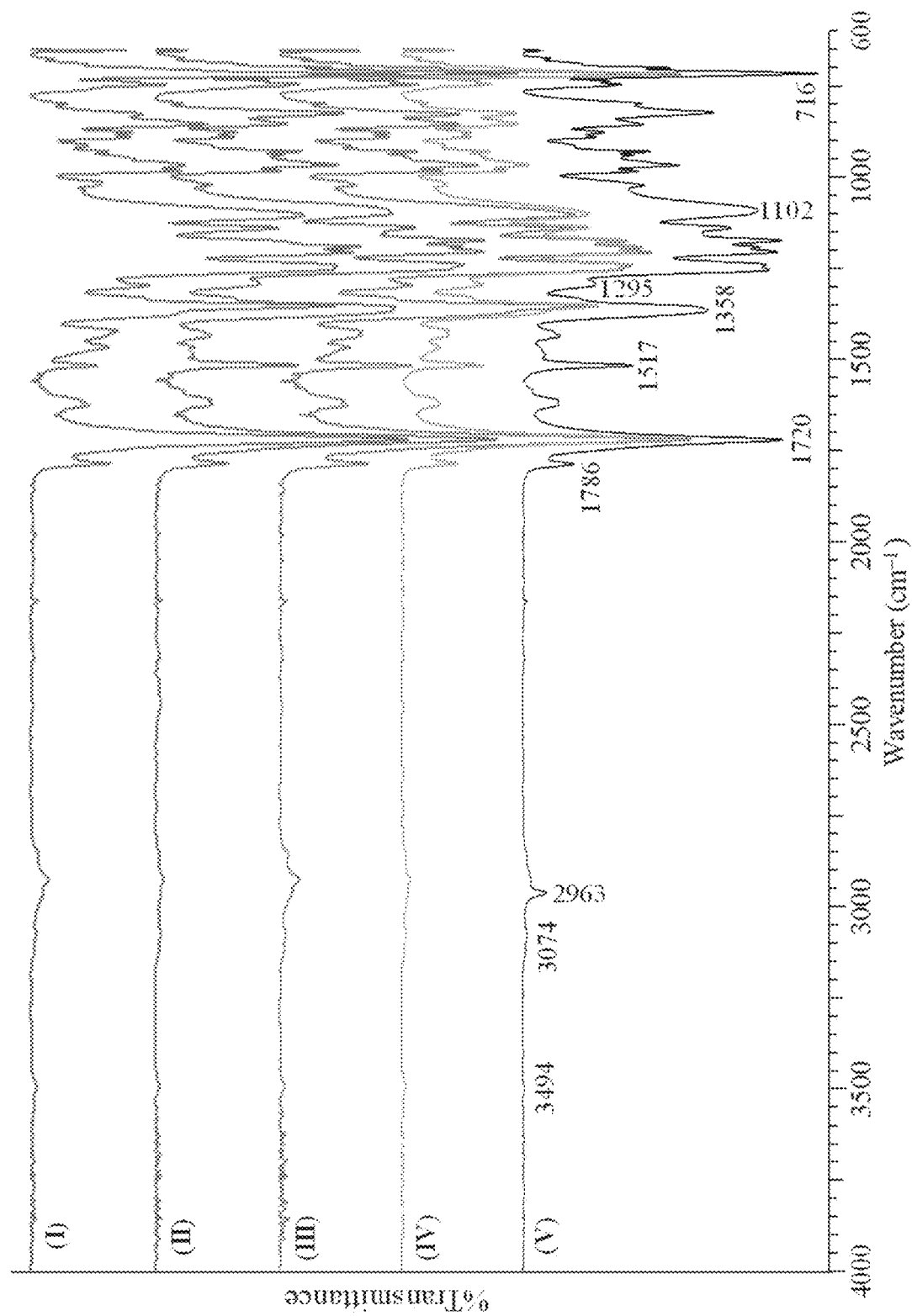
FIG. 5 shows Fourier-transform infrared spectroscopy (FTIR) spectra of prepared co-polyimides: (I) 6FDA-durene/6FpDA (1:1) (millimoles durene diamine:millimoles 6FpDA); (II) 6FDA-durene/6FpDA (1:3) (millimoles durene diamine:millimoles 6FpDA); (III) 6FDA-durene/6FpDA (3:1) (millimoles durene diamine:millimoles 6FpDA); (IV) block (6FDA-durene)/(6FDA-6FpDA) (1:1); and (V) block (6FDA-durene)/(6FDA-6FpDA) (1:4).
Figure 6:
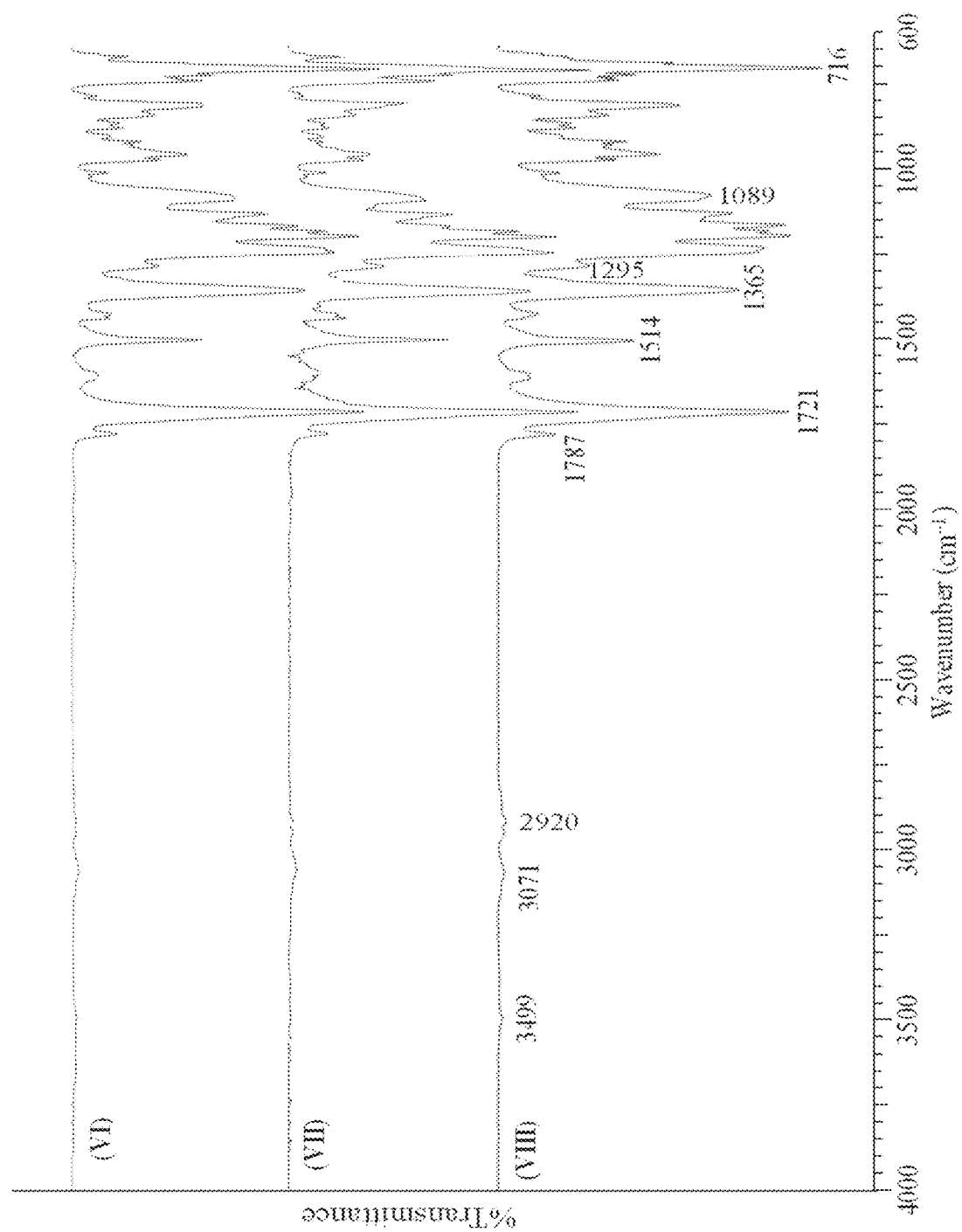
FIG. 6 shows FTIR spectra of prepared co-polyimides: (VI) 6FDA-CARDO/6FpDA (1:1) (millimoles CARDO: millimoles 6FpDA); (VII) 6FDA-CARDO/6FpDA (3:1) (millimoles CARDO:millimoles 6FpDA; and (VIII) 6FDA-CARDO/6FpDA (1:3) (millimoles CARDO:millimoles 6FpDA).

The complete one-step imidization and the structure of the prepared co-polyimides could be confirmed from their Fourier-transform infrared spectroscopy (FTIR) spectra depicted in FIGS. 5 and 6. FIG. 5 shows Fourier-transform infrared spectroscopy (FTIR) spectra of prepared co-polyimides: (I) 6FDA-durene/6FpDA (1:1) (millimoles durene diamine:millimoles 6FpDA); (II) 6FDA-durene/6FpDA (1:3) (millimoles durene diamine:millimoles 6FpDA); (III) 6FDA-durene/6FpDA (3:1) (millimoles durene diamine:millimoles 6FpDA); (IV) block (6FDA-durene)/(6FDA-6FpDA) (1:1); and (V) block (6FDA-durene)/(6FDA-6FpDA) (1:4). FIG. 6 shows FTIR spectra of prepared co-polyimides: (VI) 6FDA-CARDO/6FpDA (1:1) (millimoles CARDO:millimoles 6FpDA); (VII) 6FDA-CARDO/6FpDA (3:1) (millimoles CARDO:millimoles 6FpDA; and (VIII) 6FDA-CARDO/6FpDA (1:3) (millimoles CARDO:millimoles 6FpDA). The complete imidization is confirmed from the absence of any peaks that correspond to the intermediate species which contains amide functional groups (3500-3100 cm$^{-1}$ and 1700-1650 cm$^{-1}$).

Figure 7A:
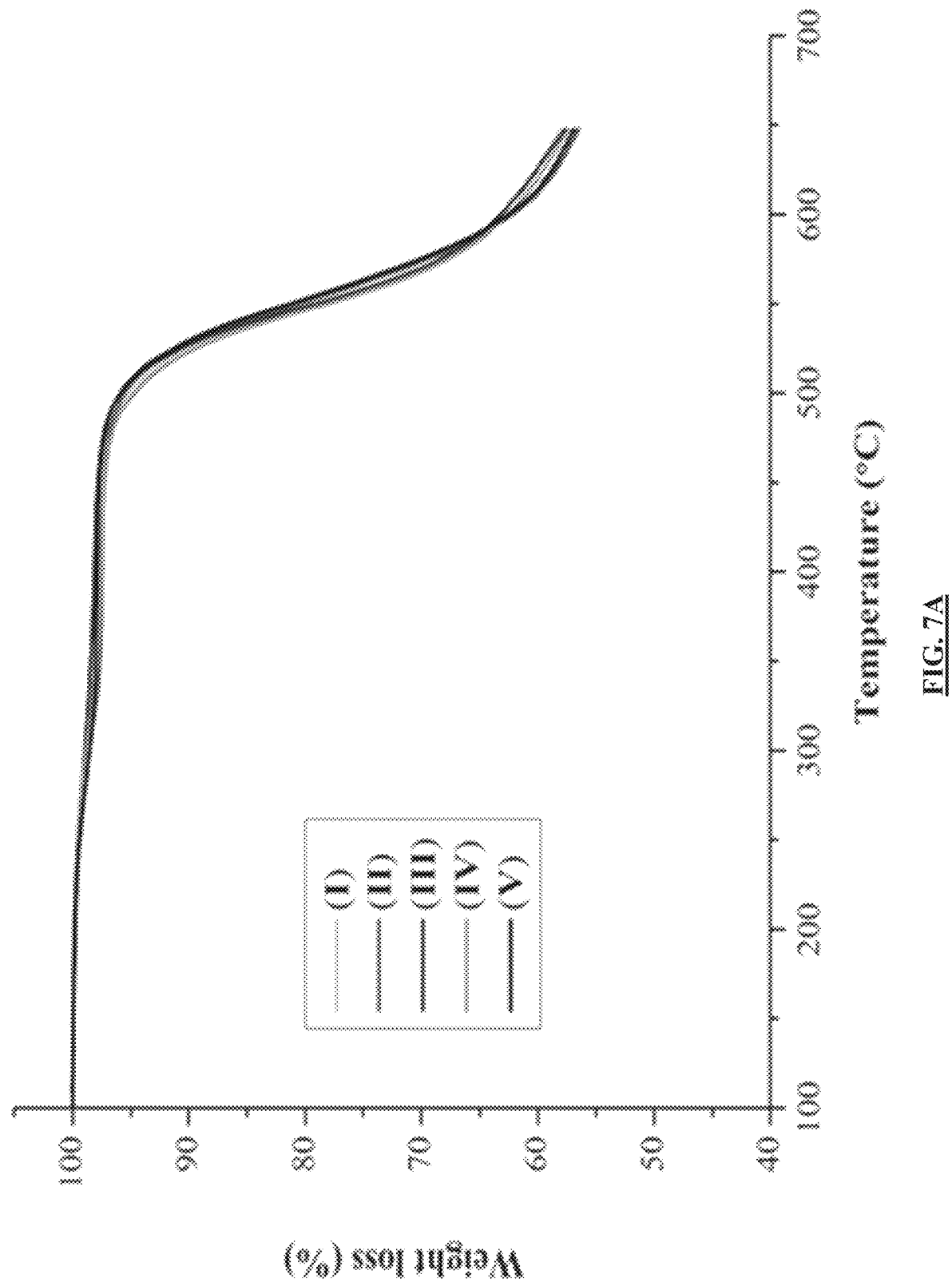
FIG. 7A shows overlapping thermogravimetric analysis (TGA) curves obtained for certain synthesized polymers of the present disclosure, used to study the thermal stability of the prepared co-polyimides.
Figure 7B:
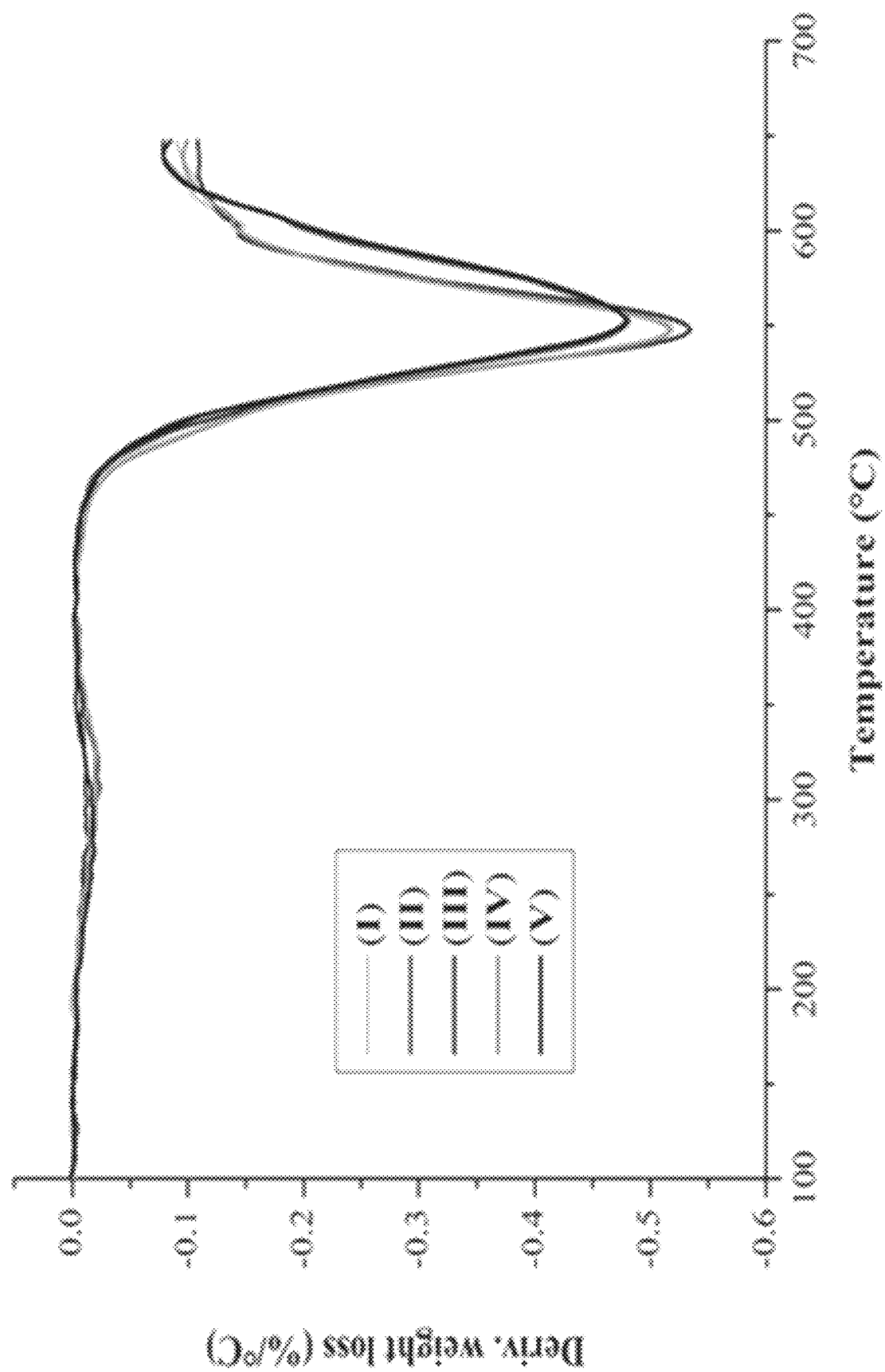
FIG. 7B shows overlapping derivative TGA curves obtained for certain synthesized polymers of the present disclosure, used to study the thermal stability of the prepared co-polyimides.

Thermogravimetric analysis was used to study the thermal stability of the prepared co-polyimides. FIG. 7A shows overlapping thermogravimetric analysis (TGA) curves obtained for certain synthesized polymers of the present disclosure, used to study the thermal stability of the prepared co-polyimides. FIG. 7B shows overlapping derivative TGA curves obtained for certain synthesized polymers of the present disclosure, used to study the thermal stability of the prepared co-polyimides. The reference numerals of FIGS. 7A and 7B correspond as follows: (I) random 6FDA-durene/6FpDA (1:1) (millimoles durene diamine:millimoles 6FpDA); (II) random 6FDA-durene/6FpDA (1:3) (millimoles durene diamine:millimoles 6FpDA); (III) random 6FDA-durene/6FpDA (3:1) (millimoles durene diamine:millimoles 6FpDA); (IV) block (6FDA-durene)/(6FDA-6FpDA) (1:1); and (V) block (6FDA-durene)/(6FDA-6FpDA) (1:4).

Figure 8A:
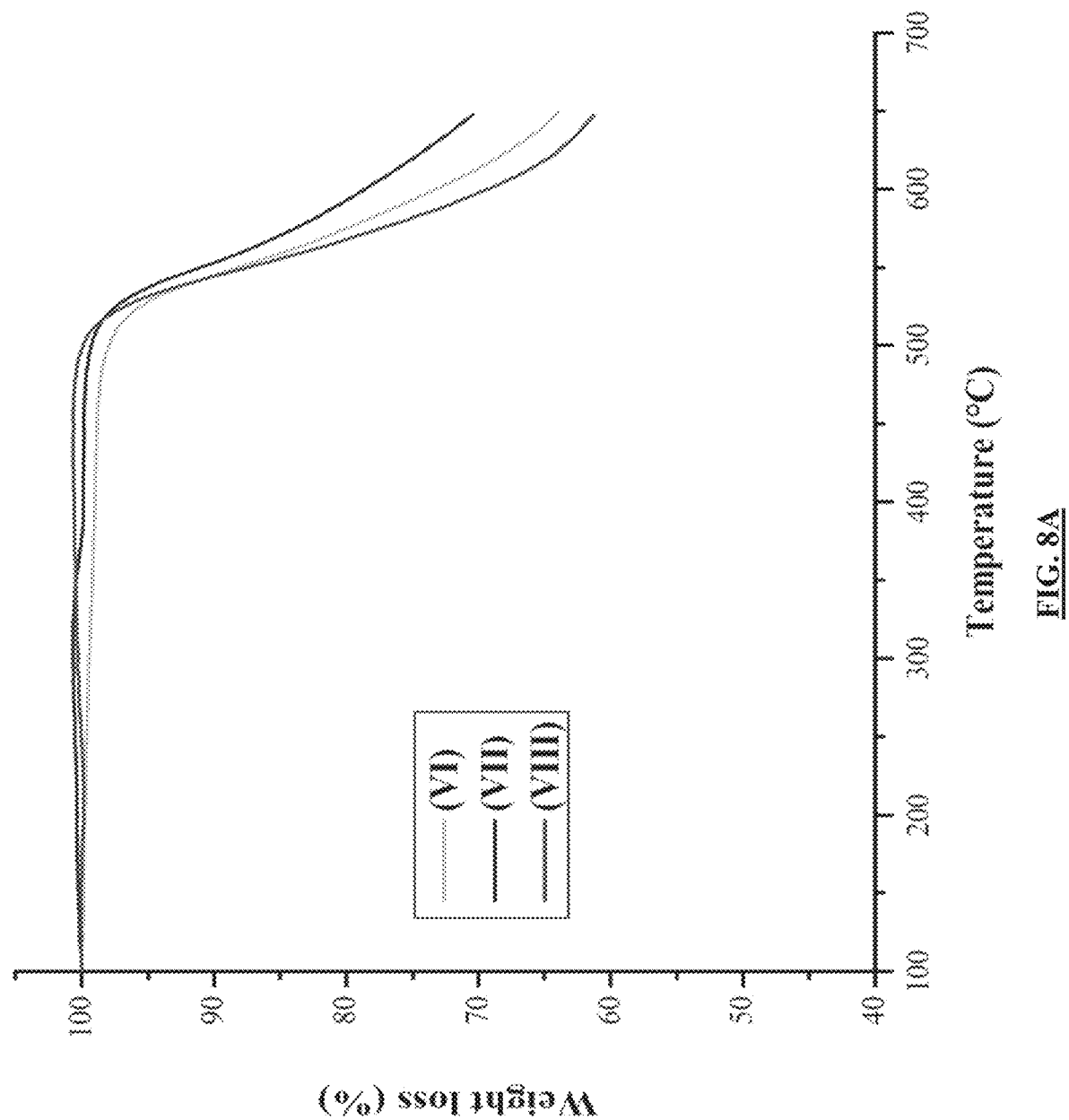
FIG. 8A shows overlapping TGA curves obtained for certain synthesized polymers of the present disclosure, used to study the thermal stability of the prepared co-polyimides.
Figure 8B:
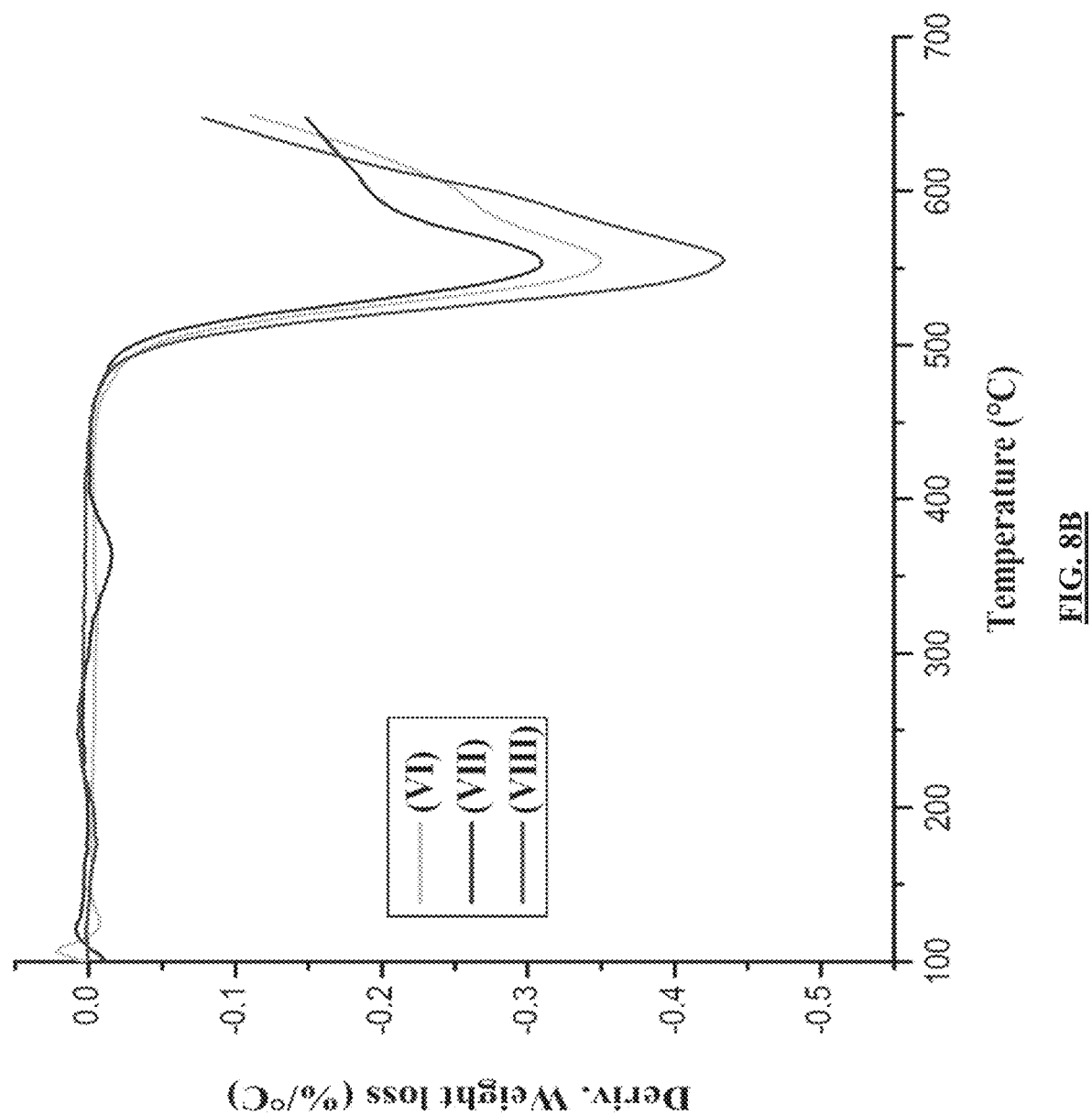
FIG. 8B shows overlapping derivative TGA curves obtained for certain synthesized polymers of the present disclosure, used to study the thermal stability of the prepared co-polyimides.

FIG. 8A shows overlapping thermogravimetric analysis (TGA) curves obtained for certain synthesized polymers of the present disclosure, used to study the thermal stability of the prepared co-polyimides. FIG. 8B shows overlapping derivative TGA curves obtained for certain synthesized polymers of the present disclosure, used to study the thermal stability of the prepared co-polyimides. The reference numerals of FIGS. 8A and 8B correspond as follows: (VI) 6FDA-CARDO/6FpDA (1:1) (millimoles CARDO:millimoles 6FpDA); (VII) 6FDA-CARDO/6FpDA (3:1) (millimoles CARDO:millimoles 6FpDA); and (VIII) 6FDA-CARDO/6FpDA (1:3) (millimoles CARDO:millimoles 6FpDA).

FIGS. 7A-B and 8A-B show typical TGA curves obtained for the synthesized polymers. The temperatures (Td) at 5% weight loss in nitrogen are shown in Tables 1 and 6 for the 6FDA-durene/6FpDA and 6FDA-CARDO/6FpDA co-polyimides, respectively. The results show that all synthesized co-polyimides have a highly-performing, surprising, and unexpected thermal stability of about at least 500° C.

Figure 9:
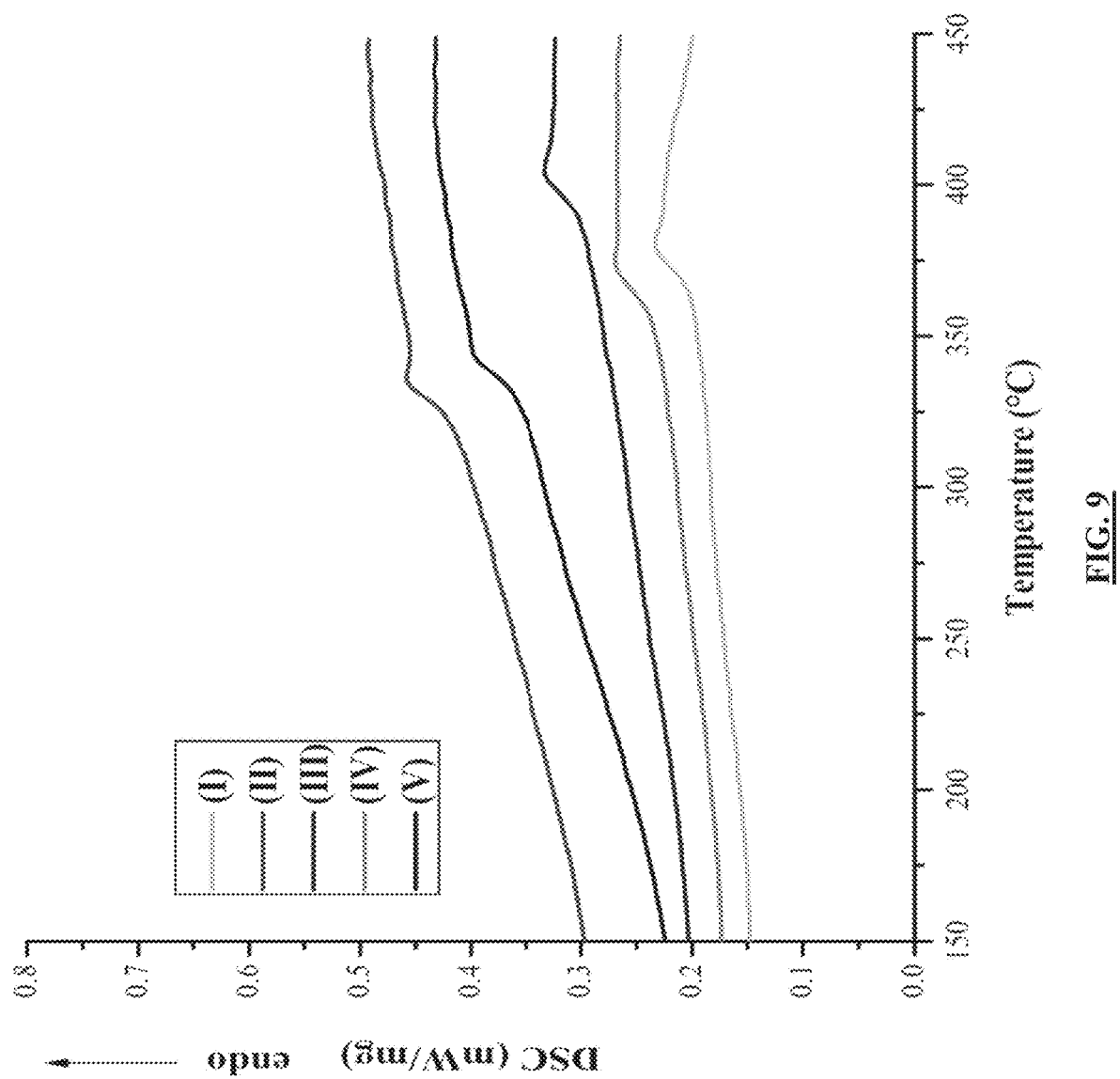
FIG. 9 shows a differential scanning calorimetry (DSC) trace graph for the prepared co-polyimides of 6FDA-durene/6FpDA.
Figure 10:
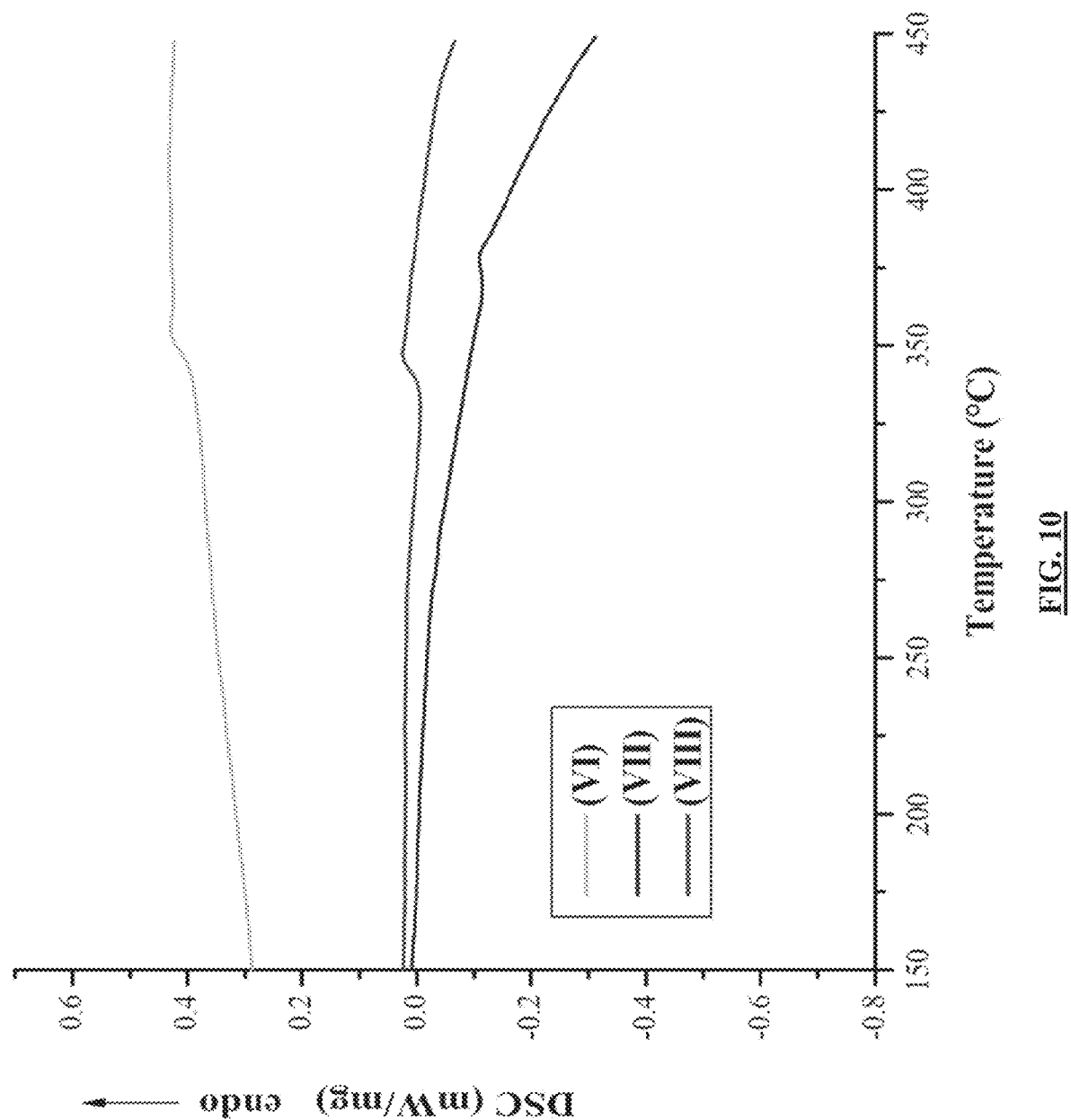
FIG. 10 shows a DSC trace graph for the prepared co-polyimides of 6FDA-CARDO/6FpDA.

The differential scanning calorimetry (DSC) traces for the prepared co-polyimides were recorded. FIG. 9 shows a differential scanning calorimetry (DSC) trace graph for the prepared co-polyimides of 6FDA-durene/6FpDA. FIG. 10 shows a DSC trace graph for the prepared co-polyimides of 6FDA-CARDO/6FpDA. FIG. 9 reference numerals correspond as follows: (I) random 6FDA-durene/6FpDA (1:1) (millimoles durene diamine:millimoles 6FpDA); (II) random 6FDA-durene/6FpDA (1:3) (millimoles durene diamine:millimoles 6FpDA); (III) random 6FDA-durene/6FpDA (3:1) (millimoles durene diamine:millimoles 6FpDA); (IV) block (6FDA-durene)/(6FDA-6FpDA) (1:1); and (V) (6FDA-durene)/(6FDA-6FpDA) (1:4). FIG. 10 reference numerals correspond as follows: (VI) random 6FDA-CARDO/6FpDA (1:1) (millimoles CARDO:millimoles 6FpDA); (VII) random 6FDA-CARDO/6FpDA (3:1) (millimoles CARDO:millimoles 6FpDA); and (VIII) 6FDA-CARDO/6FpDA (1:3) (millimoles CARDO:millimoles 6FpDA).

The DSC traces were recorded within a temperature range between 30° C. and 450° C. at a rate of 10° C./min. The glass transition temperature ($T_g$) of the synthesized polymers are also shown in Tables 1 and 6 for the copolymers respectively. $T_g$ is an indicator of the cooperative motion of polymeric chains and the presence of a single glass transition temperature indicates that there is no phase separation in both random and block co-polyimide types.

The density values of the prepared co-polyimides were measured using a Mettler Toledo XPE205 balance equipped with a density kit using cyclohexane as the buoyant solvent. The density values reported in Table 6 for the two copolymers are the average values of at least five different measurements, with error values (standard deviation) below 2%. These density values were used to calculate the fractional free volume (FFV) (depicted in Tables 1 and 6) of the co-polyimide membranes using a group contribution method.

The molar mass distribution profiles of the 6FDA-durene/6FpDA co-polyimides were determined by gel permeation chromatography (GPC). Using a cirrus GPC data analysis tool, a calibration plot was obtained from the polystyrene standards. The peak average molecular weight (Mp), the number average molecular weight (Mn), the weight average molecular weight (Mw) and polydispersity index (PDI) values of the polymers were interpolated from the calibration plot and are presented in Table 2.

The co-polyimide dense film membranes were prepared as follows: Dense films were prepared by a solution casting method. A 2-3 wt. % polymer solution was prepared in chloroform or dimethyl formamide (DMF) and the solution filtered through a 0.45 µm filter. The solution was then cast onto a dry clean Petri dish and left to evaporate at room temperature under a clean nitrogen enriched environment overnight in the case of a membrane made using chloroform. Embodiments of the dense film membranes here are dense flat sheets, and do not include or are operable in the absence of asymmetric hollow fiber membranes.

The film was then slowly heated in an oven under a slow nitrogen flow to about 60° C. for about 24 hours. However in the case of membranes made using DMF, the solution, covered with perforated aluminum foil, was left in the oven at 70° C. under a clean nitrogen enriched environment for about 24 hours. After being dried completely, the resulting film was finally dried in a vacuum oven at 150° C. overnight to remove any residual solvent, and then, the membranes were cooled to room temperature and peeled off from Petri dish after soaking in deionized water for about 15 mins. The membrane was then dried at ambient temperature under a clean nitrogen environment for about 8 hours to remove any residual water.

Example 3: Evaluation of the $CO_2/CH_4$, $He/CH_4$, and $N_2/CH_4$ Pure Gas Separation Performance of 6FDA-Durene/6FpDA and 6FDA-CARDO/6FpDA Membranes Prepared in Examples 1 and 2

The permeability coefficients of pure gases including He, $CO_2$, $CH_4$, and $N_2$ and ideal selectivities of gas pairs including He/$CH_4$, $N_2$/$CH_4$, and $CO_2$/$CH_4$ through the series of co-polyimide 6FDA-durene/6FpDA and 6FDA-CARDO/6FpDA membranes were measured and calculated at an upstream pressure of up to 300 psig and at 35° C. Results are shown in Tables 3-4 and Tables 7-8 for the two copolymers, respectively. The permeation properties of all penetrant gases depicted are an average of at least two or more measurements, and error in permeability coefficients is less than +5% of the values shown.

For the random co-polyimides, the content of 6FpDA in the copolymers was varied from 25% to 75% (3:1 to 1:3) in order to investigate the effect of segmental moiety variation in transport properties of the copolymers. As can be observed in Tables 3 and 7, all the penetrants permeabilities decrease, while the selectivities, especially $CO_2$/$CH_4$ and He/$CH_4$ increase, as the 6FpDA moiety content increases in the copolymers (i.e., 3:1 to 1:3) (millimoles durene diamine:millimoles 6FpDA). The pure gas permeability values of about 100 and 165 Barrers for $CO_2$ and He, respectively and $CO_2$/$CH_4$ and He/$CH_4$ selectivities of about 36 and 59, respectively obtained for the random copolymer 6FDA-durene/6FpDA (1:3) (millimoles durene diamine:millimoles 6FpDA) with the highest content of 6FpDA moiety (75%) are substantially similar to target performance being sought for acid gas separations and helium recovery in industrial natural gas applications. Similar separation performance was obtained for the random copolymer 6FDA-CARDO/6FpDA (1:3) (millimoles CARDO:millimoles 6FpDA) with the highest content of 6FpDA moiety (75%), as the permeability values of about 80 and about 110 Barrers for $CO_2$ and He, respectively, and $CO_2$/$CH_4$ and He/$CH_4$ selectivities of about 42 and 58, respectively, were obtained (see Table 7).

For the multi block co-polyimides, the block ratio was varied from 1:1 to 1:4 in order to see effect of this variation in permeation properties of the copolymers. As can be observed, all the penetrants permeabilities decrease, while the selectivities, especially $CO_2$/$CH_4$ and He/$CH_4$ increase as the block ratio increases. Surprising, unexpected, and advantageous values of $CO_2$ and He permeabilities of about 65 and 125 Barrers, respectively, and $CO_2$/$CH_4$ and He/$CH_4$ selectivities of about 47 and about 91, respectively, were obtained for a block copolymer (6FDA-durene)/(6FDA-6FpDA) (1:4) (Table 3). These values and separation performance exhibited by the co-polyimides are advantageous as compared to the values obtained in some of the high performance polymeric membranes that have been reported in the literature.

As shown in Tables 4 and 8 for the block co-polyimide (6FDA-durene)/(6FDA-6FpDA) (1:4) and random co-polyimide 6FDA-CARDO/6FpDA (1:3) membranes, pure gas permeability coefficients of most of the penetrants that include He, $CO_2$, $CH_4$ and $N_2$ stay relatively constant or slightly increases (especially $CO_2$) with increase in feed pressure of up to 300 psig. The membranes also showed almost constant or slight increase (especially $CO_2$/$CH_4$) in most of the penetrants selectivities with respect to $CH_4$ as depicted in the tables.

Furthermore, in addition to being selective to both $CO_2$ and He, these co-polyimides are also selective to $N_2$ as compared to methane and thus could simultaneously permeate both acid gas and $N_2$, while keeping methane in the high-pressure feed stream.

Example 4: Evaluation of the $CO_2$/$CH_4$; $N_2$/$CH_4$; and $C_2H_6$/$CH_4$ Mixed Gas Separation Performance of 6FDA-Durene/6FpDA and 6FDA-CARDO/6FpDA Membranes Prepared in Examples 1 and 2

The permeability properties of quaternary gas mixtures consisting of 10, 59, 30, and 1 volume % $CO_2$, $CH_4$, $N_2$ and $C_2H_6$, respectively, through the co-polyimide membranes were studied at different upstream pressures and are summarized in Tables 5 and 9 for block co-polyimide (6FDA-durene)/(6FDA-6FpDA) (1:4) and random co-polyimide 6FDA-CARDO/6FpDA (1:3) (millimoles CARDO:millimoles 6FpDA) membranes, respectively. $CO_2$ permeability and $CO_2$/$CH_4$ selectivity reduced to about 45 Barrers and about 39, respectively for block co-polyimide (6FDA-durene)/(6FDA-6FpDA) (1:4) and about 35 Barrers and about 35, respectively for random co-polyimide 6FDA-CARDO/6FpDA (1:3) (millimoles CARDO:millimoles 6FpDA) membranes at an elevated pressure of 800 psig. These values are quite advantageous at the elevated pressure of 800 psig.

Example 5: Evaluation of the $CO_2$/$CH_4$ and $H_2S$/$CH_4$ Sour Mixed Gas Separation Performance of the Block (6FDA-Durene)/(6FDA-6FpDA) (1:4) and Random 6FDA-CARDO/6FpDA (1:3) Membranes Prepared in Examples 1 and 2

The permeation properties of simulated sour gas mixtures consisting of 10, 57-59, 10, 1-3, and 20 volume % of $CO_2$, $CH_4$, $N_2$, $C_2H_6$ and $H_2S$, respectively, through the membranes were studied at different gas feed pressures as shown in Tables 10-11. The $CO_2$/$CH_4$ and $H_2S$/$CH_4$ ideal selectivities obtained for the block (6FDA-durene)/(6FDA-6FpDA) (1:4) are about 24 and about 14 respectively; while $CO_2$ and $H_2S$ permeabilities are about 42 and about 24 Barrers, respectively (see Table 10).

Similarly for the random co-polyimide 6FDA-CARDO/6FpDA (1:3), $CO_2$/$CH_4$ and $H_2S$/$CH_4$ ideal selectivities are about 17.8 and about 17.9, respectively, while $CO_2$ and $H_2S$ permeabilities are 37.9 and 38 Barrers, respectively (see Table 11). The values and separation performances exhibited by the co-polyimides are advantageous, surprising, and unexpected. One important point to note is that at moderate feed pressure and up to 20 vol. % $H_2S$ in the feed gas mixture, ideal selectivities and permeabilities are still moderate in the co-polyimides. Moreover, the $CO_2$/$CH_4$ selectivity of the co-polyimides does not degrade to anywhere near the same extent as was reported for cellulose acetate (CA), even under these much more aggressive environments. This stability at moderate pressures and high $H_2S$ concentration is surprising and unexpected. While not being bound to any theory or mechanism, the monomer moieties of the present disclosure when combined in random and block co-polyimides exhibit a synergistic effect allowing for increased permeabilities and selectivities for components such as $CO_2$ and $H_2S$ not found in other materials.

TABLE 1

Thermal and physical properties of the synthesized 6FDA-durene/6FpDA co-polyimides.

| Co-polyimide | Type | $T_d$ at 5% weight loss ($N_2$) (° C.) | $T_g$ (° C.) | density (g/cm$^3$) | FFV |
|---|---|---|---|---|---|
| 6FDA-durene/6FpDA (3:1) (millimoles durene diamine:,illimoles 6FpDA) | Random | 505 | 398 | 1.3782 | 0.1743 |
| 6FDA-durene/6FpDA (1:1) (millimoles durene diamine:millimoles 6FpDA) | Random | 500 | 374 | 1.4063 | 0.1723 |
| 6FDA-durene/6FpDA (1:3) (millimoles durene diamine:millimoles 6FpDA) | Random | 505 | 327 | 1.4317 | 0.1724 |

TABLE 1-continued

Thermal and physical properties of the synthesized 6FDA-durene/6FpDA co-polyimides.

| Co-polyimide | Type | $T_d$ at 5% weight loss ($N_2$) (°C.) | $T_g$ (°C.) | density (g/cm³) | FFV |
|---|---|---|---|---|---|
| (6FDA-durene)/(6FDA-6FpDA) (1:1) | Block | 497 | 366 | 1.3777 | 0.1891 |
| (6FDA-durene)/(6FDA-6FpDA) (1:4) | Block | 507 | 339 | 1.4210 | 0.1838 |

TABLE 2

The weight-average and number-average molecular weights, and PDI of the prepared 6FDA-durene/6FpDA co-polyimides.

| Co-polyimide | Type | Mw (g/mol) | Mn (g/mol) | PDI |
|---|---|---|---|---|
| 6FDA-durene/6FpDA (3:1) | Random | 27736 | 10687 | 2.62 |
| 6FDA-durene/6FpDA (1:1) | Random | 31898 | 13675 | 2.34 |
| 6FDA-durene/6FpDA (1:3) | Random | 31556 | 12821 | 2.46 |
| (6FDA-durene)/(6FDA-6FpDA) (1:1) | Block | 36212 | 14043 | 2.59 |
| (6FDA-durene)/(6FDA-6FpDA) (1:4) | Block | 44693 | 12712 | 3.53 |

TABLE 3

Pure gas permeability and selectivity coefficients in the random and block co-polyimide 6FDA-durene/6FpDA membranes measured at 100 psi feed pressure and at 35° C.

| Co-polyimide | Type | Permeability, Barrer | | | | Selectivity | | |
|---|---|---|---|---|---|---|---|---|
| | | $N_2$ | $CH_4$ | He | $CO_2$ | $N_2/CH_4$ | $He/CH_4$ | $CO_2/CH_4$ |
| 6FDA-durene/6FpDA (3:1) | Random | 25.3 | 19.1 | 312 | 378 | 1.32 | 16.34 | 19.79 |
| 6FDA-durene/6FpDA (1:1) | Random | 8.40 | 5.00 | 180 | 148 | 1.68 | 36.00 | 29.62 |
| 6FDA-durene/6FpDA (1:3) | Random | 5.60 | 2.80 | 165 | 99.6 | 2.00 | 59.00 | 35.57 |
| (6FDA-durene)/(6FDA-6FpDA) (1:1) | Block | 11.7 | 7.25 | 211 | 206 | 1.61 | 29.10 | 28.41 |
| (6FDA-durene)/(6FDA-6FpDA) (1:4) | Block | 3.00 | 1.38 | 125 | 64.9 | 2.17 | 90.58 | 47.03 |

TABLE 4

Pure gas permeation properties of block co-polyimide (6FDA-durene)/(6FDA-6FpDA) (1:4) membranes at 35° C.

| Pressure (psi) | Permeability (Barrer) | | | | Selectivity | | |
|---|---|---|---|---|---|---|---|
| | $CO_2$ | $CH_4$ | He | $N_2$ | $CO_2/CH_4$ | $He/CH_4$ | $N_2/CH_4$ |
| 100 | 64.90 | 1.38 | 125 | 3.00 | 47.03 | 90.6 | 2.17 |
| 200 | 67.46 | 1.35 | 123 | 3.24 | 49.88 | 90.8 | 2.40 |
| 300 | 73.21 | 1.32 | 123 | 3.29 | 55.26 | 93.0 | 2.49 |

TABLE 5

Mixed gases permeability and selectivity coefficients in the block co-polyimide (6FDA-durene)/(6FDA-6FpDA) (1:4) membrane as function of feed pressure at 22° C. using gas mixture containing 10; 59; 30 and 1 vol. % of $CO_2$, $CH_4$, $N_2$ and $C_2H_6$ respectively.

| Pressure (psi) | Permeability (Barrer) | | | | Ideal selectivity | | |
|---|---|---|---|---|---|---|---|
| | $CO_2$ | $CH_4$ | $N_2$ | $C_2H_6$ | $CO_2/CH_4$ | $N_2/CH_4$ | $C_2H_6/CH_4$ |
| 500 | 61.04 | 1.37 | 1.93 | 0.79 | 44.50 | 1.40 | 0.57 |
| 600 | 54.78 | 1.27 | 1.78 | 0.72 | 43.23 | 1.41 | 0.56 |
| 700 | 58.90 | 1.40 | 1.97 | 0.07 | 42.11 | 1.41 | 0.05 |
| 800 | 44.74 | 1.15 | 1.63 | 0.61 | 38.94 | 1.41 | 0.53 |

TABLE 6

Thermal and physical properties of the synthesized 6FDA-CARDO/6FpDA co-polyimides.

| Co-polyimide | Type | $T_d$ at 5% weight loss ($N_2$) (°C.) | $T_g$ (°C.) | density (g/cm³) | FFV |
|---|---|---|---|---|---|
| 6FDA-CARDO/6FpDA (3:1) | Random | 537 | 372 | 1.3669 | 0.1720 |
| 6FDA-CARDO/6FpDA (1:1) | Random | 528 | 349 | 1.4005 | 0.1707 |
| 6FDA-CARDO/6FpDA (1:3) | Random | 531 | 341 | 1.4189 | 0.1792 |

TABLE 7

Pure gas permeability and selectivity coefficients in the random co-polyimide 6FDA-CARDO/6FpDA membranes measured at 100 psig feed pressure and at 35° C.

| Co-polyimide | Type | Permeability, Barrer | | | | Selectivity | | |
|---|---|---|---|---|---|---|---|---|
| | | $N_2$ | $CH_4$ | He | $CO_2$ | $N_2/CH_4$ | $He/CH_4$ | $CO_2/CH_4$ |
| 6FDA-CARDO/6FpDA (3:1) | Random | 3.2 | 2.3 | 86.0 | 77.7 | 1.39 | 37.39 | 33.78 |
| 6FDA-CARDO/6FpDA (1:1) | Random | 1.8 | 1.1 | 74.4 | 38.5 | 1.66 | 69.53 | 35.93 |

TABLE 7-continued

Pure gas permeability and selectivity coefficients in the random co-polyimide 6FDA-CARDO/6FpDA membranes measured at 100 psig feed pressure and at 35° C.

| Co-polyimide | Type | Permeability, Barrer | | | | Selectivity | | |
|---|---|---|---|---|---|---|---|---|
| | | $N_2$ | $CH_4$ | He | $CO_2$ | $N_2/CH_4$ | He/$CH_4$ | $CO_2/CH_4$ |
| 6FDA-CARDO/ 6FpDA (1:3) | Random | 3.3 | 1.9 | 110 | 78.9 | 1.74 | 58.00 | 41.53 |

TABLE 8

Pure gas permeation properties of random co-polyimide 6FDA-CARDO/6FpDA (1:3) membranes at 35° C.

| Pressure | Permeability (Barrer) | | | | Selectivity | | |
|---|---|---|---|---|---|---|---|
| (psi) | $CO_2$ | $CH_4$ | He | $N_2$ | $CO_2/CH_4$ | He/$CH_4$ | $N_2/CH_4$ |
| 100 | 78.90 | 1.90 | 110 | 3.30 | 41.53 | 57.89 | 1.74 |
| 200 | 81.95 | 1.96 | 101 | 3.41 | 41.80 | 51.29 | 1.74 |
| 300 | 84.32 | 1.87 | 101 | 3.27 | 45.09 | 54.05 | 1.75 |

TABLE 9

Mixed gases permeability and selectivity coefficients in the random co-polyimide 6FDA-CARDO/6FpDA (1:3) membrane as a function of feed pressure at 22° C. using a gas mixture containing 10; 59; 30 and 1 vol. % of $CO_2$, $CH_4$, $N_2$ and $C_2H_6$, respectively.

| Pressure | Permeability (Barrer) | | | | Ideal selectivity | | |
|---|---|---|---|---|---|---|---|
| (psi) | $CO_2$ | $CH_4$ | $N_2$ | $C_2H_6$ | $CO_2/CH_4$ | $N_2/CH_4$ | $C_2H_6/CH_4$ |
| 300 | 47.73 | 1.06 | 1.65 | 0.68 | 44.89 | 1.55 | 0.64 |
| 400 | 43.41 | 0.92 | 1.41 | 0.57 | 47.11 | 1.53 | 0.62 |
| 500 | 39.82 | 0.92 | 1.37 | 0.57 | 43.45 | 1.50 | 0.62 |
| 600 | 40.07 | 0.98 | 1.45 | 0.60 | 41.07 | 1.48 | 0.61 |
| 800 | 35.23 | 1.00 | 1.48 | 0.58 | 35.12 | 1.47 | 0.58 |

TABLE 10

Sour mixed gas permeability and selectivity coefficients in the block co-polyimide (6FDA-durene)/(6FDA-6FpDA) (1:4) membrane measured at 22° C. and using sour feed gas mixture containing 10; 59; 10; 1 and 20 vol. % of $CO_2$, $CH_4$, $N_2$, $C_2H_6$ and $H_2S$ respectively.

| $H_2S$ comp. vol. % | $C_2H_6$ comp vol. % | Total feed pressure (psig) | Permeability (Barrer) | | | | | Ideal selectivity | |
|---|---|---|---|---|---|---|---|---|---|
| | | | $N_2$ | $CH_4$ | $C_2H_6$ | $CO_2$ | $H_2S$ | $CO_2/CH_4$ | $H_2S/CH_4$ |
| 20.0 | 1.0 | 350 | 2.2 | 1.8 | 1.4 | 42.0 | 24.4 | 23.57 | 13.68 |
| | | 500 | 2.2 | 2.0 | 1.6 | 41.7 | 26.4 | 20.75 | 13.12 |

TABLE 11

Sour mixed gas permeability and selectivity coefficients in the random co-polyimide 6FDA-CARDO/6FpDA (1:3) membrane measured at 22° C. and using sour feed gas mixture containing 10; 57; 10; 3 and 20 vol. % of $CO_2$, $CH_4$, $N_2$, $C_2H_6$ and $H_2S$ respectively.

| $H_2S$ comp. vol. % | $C_2H_6$ comp vol. % | Total feed pressure (psi) | Permeability (Barrer) | | | | | Ideal selectivity | |
|---|---|---|---|---|---|---|---|---|---|
| | | | $N_2$ | $CH_4$ | $C_2H_6$ | $CO_2$ | $H_2S$ | $CO_2/CH_4$ | $H_2S/CH_4$ |
| 20.0 | 3.0 | 400 | 3.1 | 2.1 | 2.0 | 37.9 | 38.0 | 17.83 | 17.88 |

The present disclosure shows co-polyimide membranes suitable and advantageous for acid gas separation and helium recovery from natural gas using the newly-developed 6FDA-6FpDA-type aromatic co-polyimide membranes. The membranes exhibit surprising and unexpected pure and gas mixture permeation properties, as the pure gas $CO_2$ and He permeabilities are about 65 and 125 Barrers, respectively and $CO_2/CH_4$ and He/CH4 selectivities are about 47 and 91, respectively obtained at 35° C. and feed pressure of 100 psi for the (6FDA-durene)/(6FDA-6FpDA) (1:4) block co-polyimide membrane.

In addition, the random copolymer 6FDA-CARDO/6FpDA (1:3) exhibited advantageous, surprising, and unexpected separation performance as the pure gas permeability values of 79 and 110 Barrers for $CO_2$ and He, respectively, and $CO_2/CH_4$ and He/$CH_4$ selectivities of 42 and 58 were respectively obtained for the copolymer. Furthermore, the permeation properties of simulated sour gas mixtures consisting of 10; 57-59; 10; 1-3; and 20 vol. % of $CO_2$, $CH_4$, $N_2$, $C_2H_6$ and $H_2S$ respectively, through the membrane were studied at different gas feed pressures. The $CO_2/CH_4$ and $H_2S/CH_4$ ideal selectivities obtained for the block (6FDA-durene)/(6FDA-6FpDA) (1:4) are 24 and 14 respectively; while $CO_2$ and $H_2S$ permeabilities are 42 and 24 Barrers, respectively. Similarly for the random co-polyimide 6FDA-CARDO/6FpDA (1:3), $CO_2/CH_4$ and $H_2S/CH_4$ ideal selectivities are 17.8 and 17.9 respectively, while $CO_2$ and $H_2S$ permeabilities are 37.9 and 38 Barrers respectively.

The values and separation performance exhibited by the co-polyimides are advantageous as compared to the values obtained in some existing high performance polymeric membranes. One important advantage here is that at moderate feed pressure and up to 20 vol. % $H_2S$ in a feed gas mixture, ideal selectivities and permeabilities are still suitable in the co-polyimide membranes. Moreover, the $CO_2/CH_4$ selectivity of the co-polyimides does not degrade to anywhere near the same extent as was reported for cellulose acetate (CA), even under the much presently disclosed aggressive environments. This stability at moderate pressures and high $H_2S$ concentration is impressive and unique.

Another unique result obtained is the co-polyimide membranes are not only acid gas, most especially $CO_2$ selective, but also slightly selective to $N_2$ as compare to $CH_4$ (i.e., the permeation of $N_2$ in aromatic polyimides is higher than $CH_4$). This is an advantage and energy can be saved as the membrane simultaneously permeates both acid gas and $N_2$, while keeping $CH_4$ in the high pressure zone of a separation device or process.

The singular forms "a," "an," and "the" include plural referents, unless the context clearly dictates otherwise.

In the drawings and specification, there have been disclosed embodiments of apparatus, systems, and methods for aromatic co-polyimide membranes for sour natural gas separation, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A membrane for separating the components of a sour natural gas feed, the membrane comprising:
   at least three distinct moieties polymerized together, the moieties including a 2,2'-bis(3,4-dicarboxyphenyl) hexafluoropropane dianhydride (6FDA) based moiety; a 4,4'-(hexafluoroisopropylidene)dianiline (6FpDA) based moiety; and at least one component selected from the group consisting of: a 9,9-bis(4-aminophenyl) fluorene (CARDO) based moiety; a 2,3,5,6-tetramethyl-1, 4-phenylenediamine (durene diamine) based moiety; a 2,2'-bis(trifluoromethyl)benzidine (ABL-21) based moiety; a 3,3'-dihydroxybenzidine based moiety; and a 3,3'-(hexafluoroisopropylidene)dianiline based moiety, wherein the molar ratio of the 6FpDA based moiety to the at least one component selected from the group is between about 3:1 and about 1:3 to control segmental moiety variation in transport properties of the membrane including permeability and selectivity to target performance suitable for acid gas separations and helium recovery in industrial natural gas applications.

2. The membrane according to claim 1, where the membrane comprises random co-polymers.

3. The membrane according to claim 2, where the membrane comprises the CARDO based moiety.

4. The membrane according to claim 3, where the molar ratio of the CARDO based moiety to the 6FpDA based moiety is between about 1:3 to about 3:1.

5. The membrane according to claim 2, where the membrane comprises the durene diamine based moiety.

6. The membrane according to claim 5, where the molar ratio of the durene diamine based moiety to the 6FpDA based moiety is between about 1:3 to about 3:1.

7. The membrane according to claim 1, where the membrane comprises block co-polymers.

8. The membrane according to claim 7, where the membrane comprises the CARDO based moiety.

9. The membrane according to claim 7, where the membrane comprises the durene diamine based moiety.

10. The membrane according to claim 9, where the block co-polymers include a polymer block length L of the 6FDA and the durene diamine based moiety, and include a polymer block length M of the 6FDA and the 6FpDA based moiety, and L is about between 1,000-20,000 units and M is about between 1,000-20,000 units.

11. The membrane according to claim 10, where the block ratio of L:M is between about 1:1 and about 1:4.

12. The membrane according to claim 10, where L is about 2,500 units and M is about 2,500 units.

13. The membrane according to claim 10, where L is about 5,000 units and M is about 5,000 units.

14. The membrane according to claim 10, where L is about 15,000 units and M is about 15,000 units.

15. A method of gas separation, the method comprising the step of:
   applying the membrane of claim 1 to separate at least 2 components of a mixed gas stream.

16. The method according to claim 15, where feed pressure of the mixed gas stream to a feed side of the membrane is up to about 800 psig and $H_2S$ content of the mixed gas stream is up to about 20 volume percent.

17. The method according to claim 15, where the mixed gas stream comprises $CO_2$, $CH_4$, $N_2$, $C_2H_6$, and $H_2S$.

18. A method for making a membrane for separating components of a sour natural gas feed, the method comprising the steps of:
   combining at least three different monomers to form a co-polyimide, the monomers including 2,2'-bis(3,4-dicarboxyphenyl)hexafluoropropane dianhydride (6FDA); 4,4'-(hexafluoroisopropylidene)dianiline (6FpDA); and at least one component selected from the group consisting of: 9,9-bis(4-aminophenyl) fluorene (CARDO); a 2,3,5,6-tetramethyl-1,4-phenylenediamine (durene diamine); 2,2'-bis(trifluoromethyl)benzidine (ABL-21); 3,3'-dihydroxybenzidine; and 3,3'-(hexafluoroisopropylidene)dianiline, wherein the molar ratio of the 6FpDA based moiety to the at least one component selected from the group is between about 3:1 and about 1:3 to control segmental moiety variation in transport properties of the membrane including permeability and selectivity to target performance suitable for acid gas separations and helium recovery in industrial natural gas applications; and
   preparing a dense film from the co-polyimide using a solution casting process.

19. The method of gas separation, the method comprising the step of:
   using the dense film of claim 18 to separate at least 2 components of a mixed gas stream.

20. The method according to claim 18, where the step of combining is carried out to create random co-polymers.

21. The method according to claim 20, where the step of combining includes combining the 6FDA, the 6FpDA, and the CARDO.

22. The method according to claim 21, where the molar ratio of the CARDO to the 6FpDA is between about 1:3 to about 3:1.

23. The method according to claim 20, where the step of combining includes combining the 6FDA, the 6FpDA, and the durene diamine.

24. The method according to claim 23, where the molar ratio of the durene diamine to the 6FpDA is between about 1:3 to about 3:1.

25. The method according to claim 18, where the step of combining is carried out to create block co-polymers.

26. The method according to claim 25, where the step of combining includes combining the 6FDA, the 6FpDA, and the CARDO.

27. The method according to claim 25, where the step of combining includes combining the 6FDA, the 6FpDA, and the durene diamine.

28. The method according to claim 25, where the block co-polymers include a polymer block length L of the 6FDA and the durene diamine and include a polymer block length M of the 6FDA and the 6FpDA, and L is between about 1,000-20,000 units and M is between about 1,000-20,000 units.

29. The method according to claim 28, where the block ratio of L:M is between about 1:1 and about 1:4.

* * * * *